United States Patent
Jeon et al.

(10) Patent No.: US 10,469,844 B2
(45) Date of Patent: *Nov. 5, 2019

(54) INTRA PREDICTION IN IMAGE PROCESSING

(71) Applicant: LG ELECTRONICS INC., Seoul (KR)

(72) Inventors: Yong Joon Jeon, Seoul (KR); Seung Wook Park, Seoul (KR); Jung Sun Kim, Seoul (KR); Joon Young Park, Seoul (KR); Byeong Moon Jeon, Seoul (KR); Jae Hyun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/797,895

(22) Filed: Oct. 30, 2017

(65) Prior Publication Data

US 2018/0054618 A1 Feb. 22, 2018

Related U.S. Application Data

(63) Continuation of application No. 15/344,118, filed on Nov. 4, 2016, now Pat. No. 9,832,472, which is a
(Continued)

(51) Int. Cl.
*G06K 9/36* (2006.01)
*H04N 19/159* (2014.01)
(Continued)

(52) U.S. Cl.
CPC .......... *H04N 19/159* (2014.11); *H04N 19/00* (2013.01); *H04N 19/117* (2014.11);
(Continued)

(58) Field of Classification Search
CPC ...... H04N 19/159; H04N 19/00; H04N 19/86; H04N 19/82; H04N 19/117; H04N 19/176; H04N 19/105; H04N 19/593
See application file for complete search history.

(56) References Cited

U.S. PATENT DOCUMENTS 9,100,621 B2 8/2015 Jeon et al.
9,832,472 B2 * 11/2017 Jeon ..................... H04N 19/159
(Continued)

FOREIGN PATENT DOCUMENTS

CN 1535027 A 10/2004
CN 1984341 A 6/2007
(Continued)

OTHER PUBLICATIONS

Winken, et al.: "Description of video coding technology proposal by Fraunhofer HHHI", JCTVC-A116, XP0300007557, Joint Collaborative Team on Video Coding (JCT-VC) of ITU-T SG16 WP3 and ISO/IEC JTC1/SC29/WG11, 1st Meeting, Dresden, DE, Apr. 15-23, 2010.
(Continued)

*Primary Examiner* — Amir Alavi
(74) *Attorney, Agent, or Firm* — Dentons US LLP

(57) ABSTRACT

An intra prediction method and a device using the intra prediction method are provided. The intra prediction method includes the steps of: deriving a current prediction mode as a prediction mode of a current block; constructing neighboring samples of the current block with available reference samples; filtering the available reference samples; and generating predicted samples of the current block on the basis of the filtered available reference samples. The filtering step includes performing the filtering using the available reference sample located in the prediction direction of the current prediction mode and a predetermined number of available
(Continued)

reference samples neighboring to the prediction direction of the current prediction mode.

12 Claims, 28 Drawing Sheets

Related U.S. Application Data continuation of application No. 14/730,939, filed on Jun. 4, 2015, now Pat. No. 9,661,332, which is a continuation of application No. 13/922,468, filed on Jun. 20, 2013, now abandoned.

(51) Int. Cl.

| | | |
|---|---|---|
| *H04N 19/00* | (2014.01) | |
| *H04N 19/117* | (2014.01) | |
| *H04N 19/593* | (2014.01) | |
| *H04N 19/86* | (2014.01) | |
| *H04N 19/176* | (2014.01) | |
| *H04N 19/82* | (2014.01) | |
| *H04N 19/105* | (2014.01) | |

(52) U.S. Cl.
CPC ......... *H04N 19/176* (2014.11); *H04N 19/593* (2014.11); *H04N 19/86* (2014.11); *H04N 19/105* (2014.11); *H04N 19/82* (2014.11)

(56) References Cited

U.S. PATENT DOCUMENTS

| | | | | |
|---|---|---|---|---|
| 2004/0136458 | A1 | 7/2004 | Dahlhoff et al. | |
| 2007/0133891 | A1* | 6/2007 | Jeong .................. | H04N 19/176 382/238 |
| 2009/0225842 | A1* | 9/2009 | Cheon .................. | H04N 19/176 375/240.13 |
| 2011/0200103 | A1* | 8/2011 | Kim ..................... | H04N 19/159 375/240.03 |
| 2012/0082224 | A1* | 4/2012 | Van Der Auwera ........................ | H04N 19/176 375/240.12 |
| 2012/0195378 | A1* | 8/2012 | Zheng .................. | H04N 19/105 375/240.12 |
| 2013/0034530 | A1 | 4/2013 | Rosewarne ............. | 375/240.18 |
| 2013/0094589 | A1* | 4/2013 | Rosewarne ............ | H04N 19/70 375/240.18 |
| 2013/0188702 | A1* | 7/2013 | Li .................... | H04N 19/00569 375/240.12 |
| 2013/0272404 | A1* | 10/2013 | Park ....................... | H04N 19/56 375/240.15 |
| 2013/0272623 | A1* | 10/2013 | Jeon ..................... | H04N 19/159 382/238 |
| 2014/0098859 | A1* | 4/2014 | Lim ....................... | H04N 19/13 375/240.12 |
| 2014/0119441 | A1* | 5/2014 | Lee ........................ | H04N 19/11 375/240.12 |
| 2014/0233647 | A1 | 8/2014 | Hendry et al. ........... | 375/240.15 |
| 2014/0294088 | A1 | 10/2014 | Sung et al. ............. | 375/240.16 |
| 2015/0271503 | A1 | 9/2015 | Jeon et al. | |
| 2018/0054618 | A1* | 2/2018 | Jeon ....................... | H04N 19/86 |

FOREIGN PATENT DOCUMENTS

| | | |
|---|---|---|
| CN | 101658041 A | 2/2010 |
| CN | 101895751 A | 11/2010 |
| KR | 1020040062651 A | 7/2004 |
| KR | 2007-0062146 A | 6/2007 |
| KR | 2009-0095014 A | 9/2009 |
| KR | 2010-0045007 A | 5/2010 |
| KR | 1020100046467 A | 5/2010 |
| WO | 03049452 A2 | 6/2003 |
| WO | 2008131044 A2 | 10/2008 |
| WO | 2009/110741 A2 | 9/2009 |
| WO | 2010047499 A2 | 4/2010 |

OTHER PUBLICATIONS

U.S. Appl. No. 13/922,468, filed Jun. 7, 2013.
U.S. Appl. No. 14/730,939, filed Jun. 4, 2015.
Jeon Y. et al: "On Intra Soothing", JCT-VC Meeting; 97: No. JCTVC-F104, Jul. 1, 2011 (Jul. 1, 2011), XP030009127.
Kim H. Y. et al: "Video coding technology proposal by the Electronics and Telecommunications Research Institute (ETRI)", JCT-VC Meeting: No. JCTVF-A127, Apr. 21, 2010 (Apr. 21, 2010), XP030007579.
Zheng Y. et al: "Simplified Intra Smoothing", 94 MPEG Meeting; No. M18274, Oct. 7, 2010 (Oct. 7, 2010), XP0300468644.
Mccann K. et al: "Video Coding Technology Proposal by Samsung (and BBC)", 1. JCT-VC Meeting; No. JCTVC-A124; Jun. 1, 2010 (Jun. 1, 2010), XP030007573.
Sekiguchi S. et al: "DCT-Based Noise Filtering for Intra Prediction Samples", 2, JCT-VC Meeting; No. JCTVC-B067, Jul. 23, 2010 (Jul. 23, 2010), XP030007647.
International Search Report dated May 11, 2012 for Application No. PCT/KR2011/009494 with English Translation, 4 pages.
G. Li, et al., "Integration of Plane Mode in Unified Intra Prediction," Joint Collaborative Team on Video Coding (JCT-VC) of ITU-T SG16 WP3 and ISO/IEC JTC1/SC29/WG11, Oct. 7-15, 2010, JCTVC-C111.
U.S. Appl. No. 15/344,118, filed Nov. 4, 2016 (U.S. Pat. No. 9,832,472).
U.S. Appl. No. 14/730,939, filed Jun. 4, 2015 (U.S. Pat. No. 9,661,332).
U.S. Appl. No. 13/992,468, filed Jun. 7, 2013 (U.S. Pat. No. 9,100,621).

* cited by examiner

INTRA PREDICTION IN IMAGE PROCESSING

This application is a continuation of 15/344,118 filed Nov. 4, 2016, which is a continuation of 14/730,939 filed Jun. 4, 2015, which is a continuation of 13/992,468 filed Jun. 7, 2013, which is a U.S. National Phase Application under 35 U.S.C. § 371 of International Application PCT/KR2011/009494, filed on Dec. 8, 2011, which claims the benefit of U.S. Provisional Application No. 61/421,191, filed on Dec. 8, 2010, and U.S. Provisional Application Nos. 61/475,223, and 61/475,225 filed on Apr. 13, 2011, the entire content of the prior applications is hereby incorporated by reference.

TECHNICAL FIELD

The present invention relates to image information processing method and device, and more particularly, to a filtering method on neighboring samples performed in the process of intra prediction of image information and a device using the filtering method.

BACKGROUND ART

Recently, demands for a high-resolution and high-quality image have increased in various fields of applications. As an image as higher resolution and higher quality, an amount of information on the image increases more. Accordingly, when image information is transferred using media such as existing wired or wireless broadband lines or image information is stored in existing storage media, the information transfer cost and the information storage cost increase. Therefore, high-efficiency image compressing techniques can be used to effectively transfer, store, and reproduce information on high-resolution and high-quality images.

Inter prediction and intra prediction can be used to enhance image compression efficiency.

In the inter prediction, pixel valises of a current picture are predicted from temporally previous anchor subsequent pictures. The intra prediction, pixel values of a current picture are predicted using pixel information in the current picture.

In addition to the inter prediction and the intra prediction, a weighting value predicting technique for preventing degradation in image quality due to a variation in illumination or the like, an entropy encoding technique of assigning a short code to a symbol with a high appearance frequency and assigning a long code to a symbol with a low appearance frequency, and the like can be used for more efficiently processing image information.

SUMMARY OF INVENTION

Technical Problem

An object of the invention is to provide an effective image compression technique and a device using the technique.

Another object of the invention is to provide an intra prediction method which can enhance prediction efficiency and a device using the method.

Still another aspect of the invention is to provide a method and a device that perform a filtering process on neighboring reference pixels in the process of intra prediction so as to reduce artifacts of a reconstructed image.

Still another aspect of the invention is to provide a method and a device that perform a filtering process on neighboring reference samples on the basis of an intra prediction mode of a current block.

Still another aspect of the invention is to provide a method of determining whether a filtering process should be performed on neighboring reference samples on the basis of the size and the intra prediction mode of a current block and a device using the method.

Still another aspect of the invention is to provide a method and a device that reduce complexity of an intra prediction process by specifying neighboring reference samples to be filtered.

Still another aspect of the invention is to provide a method and a device that reduce artifacts by performing post-prediction filtering process when a filtering process is not performed before intra prediction.

Technical Solution (1) According to an aspect of the invention, there is provided an intra prediction method including steps of: deriving a current prediction mode as a prediction mode of a current block; constructing neighboring samples of the current block with available reference samples; filtering the available reference samples; and generating predicted samples of the current block on the basis of the filtered available reference samples, wherein the filtering step includes performing the filtering using the available reference sample located in the prediction direction of the current prediction mode and a predetermined number of available reference samples neighboring to the prediction direction of the current prediction mode.

(2) In the intra prediction method according to (1), the filtering step may include applying a 3-tap filter with a filtering coefficient of [1 2 1] to the available reference sample.

(3) In the intra prediction method according to (1), the filtering step may include applying a filtering using a 3-tap filter to a first available reference sample located in the prediction direction of the current prediction mode, a second available reference sample located on the left side of the first available reference sample, and a third available reference sample located on the right side of the first available reference sample to generate a modified reference sample at the position of the first available reference sample.

(4) In the intra prediction method according to (1), the current prediction mode may be any one of a prediction mode having an eighth prediction direction on the right side of a vertical prediction mode, a prediction mode having an eighth prediction direction on the left side of a vertical prediction mode, and a prediction mode having an eighth prediction direction on the bottom side of a horizontal prediction mode.

(5) In the intra prediction method according to (1), the filtering step may include filtering only the available reference sample usable in the current prediction mode.

(6) In the intra prediction method according to (5), when the current prediction mode has a right prediction direction of a vertical prediction mode, only the available reference samples on the top side and the top-right side of the current block and the available reference sample neighboring the top-left corner of the current block may be filtered.

(7) In the intra prediction method according to (5), when the current prediction mode has a left prediction direction of a vertical prediction mode or an upward prediction direction of a horizontal prediction mode, the available reference samples on the top side and the left side of the current block and the available reference sample neighboring the top-left corner of the current block may be filtered.

(10) In the intra prediction method according to (5), when the current prediction mode has a downward prediction direction of a horizontal prediction mode, the available reference samples on the left side and the left-bottom side of the current block and the available reference sample neighboring the top-left corner of the current block may be filtered.

(9) In the intra prediction method according to (1), it may be determined whether the filtering step should be performed depending on the size and the current prediction mode of the current block.

(10) In the intra prediction method according to (9), the predicted samples may be generated on the basis of the available reference sample when it is determined that the filtering step is not performed, and a smoothing process using a 2-tap filter may be performed on the available reference sample and the predicted sample neighboring the available reference sample out of the predicted samples.

(11) According to another aspect of the invention, there is provided an encoding device including: a prediction module that performs a prediction on a current block to generate a predicted block; and an entropy encoding module that encodes information on the prediction and the predicted block, wherein the prediction module performs a filtering on neighboring available reference samples of the current block and generates the predicted block of the current block on the basis of the filtered available reference samples, and wherein the filtering on the available reference samples includes applying a 3-tap filter to the available reference sample located in the prediction direction of an intra prediction mode of the current block and a predetermined number of available reference samples neighboring to the prediction direction of the current prediction mode.

(12) In the encoding device according to (11), the 3-tap filter may have a filtering coefficient of [1 2 1].

(13) According to still another aspect of the invention, there is provided a decoding device including: an entropy decoding module that entropy-decodes information received from an encoder; and a prediction module that performs a prediction on a current block on the basis of the entropy-decoded information, wherein the prediction module performs a filtering on neighboring available reference samples of the current block and generates a predicted block of the current block on the basis of the filtered available reference samples, and wherein the filtering on the available reference samples includes applying a 3-tap filter to the available reference sample located in the prediction direction of intra prediction mode of the current block and a predetermined number of available reference samples neighboring to the prediction direction of the current prediction mode.

(14) In the decoding device according to (13) the 3-tap may have a filtering coefficient of [1 2 1].

Advantageous Effects

According to the invention, it is possible to enhance intra prediction efficiency and to enhance quality of reconstructed image.

According to the invention, it is possible to remove artifacts which may appear in a reconstructed image in the process of intra prediction.

According to the invention, it is possible to adaptively determine whether a filtering process should be performed on a neighboring block depending on the size, the intra prediction mode, and the like of current block.

According to the invention, it is possible to reduce complexity of an intra prediction process by specifying neighboring samples to be filtered on the basis of an intra prediction mode.

According to the invention, it is possible to remove artifacts by performing a post-prediction process when a filtering process is not performed on reference samples before intra prediction.

MODE FOR INVENTION

Figure 1:
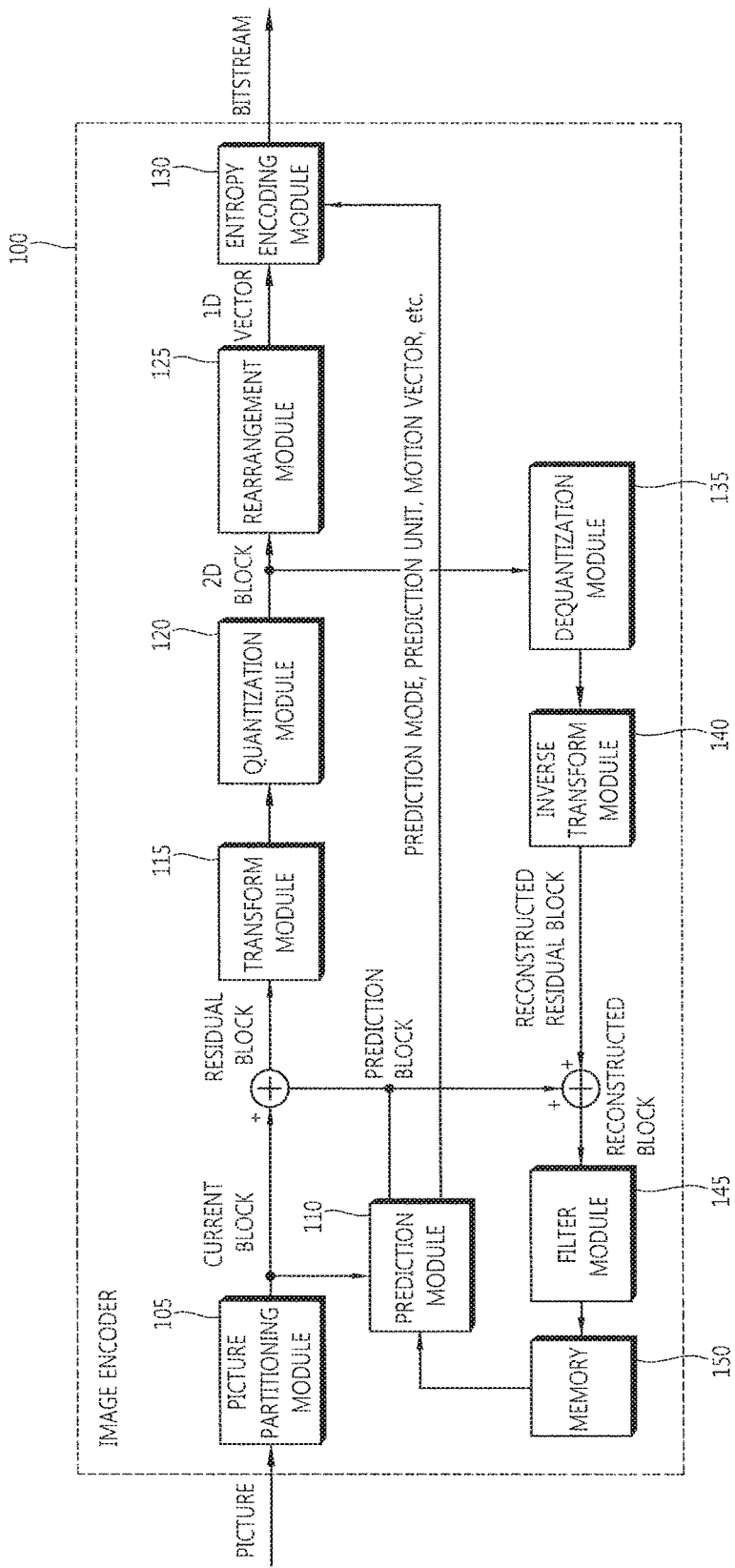
FIG. 1 is a block diagram schematically illustrating an image encoding device according to an embodiment of the invention.

The present invention can be variously modified in various forms, and specific embodiments thereof will be described and shown in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions in an image encoding/decoding apparatus and does not mean that the elements are embodied by independent hardware or independent software. For example, two or more elements of the elements may be combined to form a single element, or one element may be divided into plural elements. The embodiments in which the elements are combined and/or divided belong to the scope of the invention without departing from the concept of the invention.

Hereinafter, exemplary embodiments of the invention will be described in detail with reference to the accompanying drawings. Like constituents in the drawings will be referenced by like reference numerals and will not be repeatedly described.

FIG. 1 is a block diagram schematically illustrating an encoding apparatus (encoder) according to an embodiment of the invention. Referring to FIG. 1, an image encoding apparatus 100 includes a picture partitioning module 105, a prediction module 110, a transform module 115, a quantization module 120, a rearrangement module 125, an entropy encoding module 130, a dequantization module 135, an inverse transform module 140, a filter module 145, and a memory 150.

The picture partitioning module 105 can divide an input picture into at least one processing unit blocks. Here, a block as a processing unit may be a prediction unit (hereinafter, referred to as a "PU"), a transform unit (hereinafter, referred to as a "TU"), or a coding unit (hereinafter, referred to as a "CU").

The prediction module 110 includes an inter prediction module that performs an inter prediction process and an intra prediction module that performs an intra prediction process, as described later. The prediction module 110 performs a prediction process on the processing units of a picture partitioned by the picture partitioning module 105 to generate a prediction block. In the prediction module 110, the processing unit of a picture may be a CU, a TU, or a PU. The prediction module 110 can determine whether the prediction performed on the corresponding processing unit is an inter prediction or an intra prediction, and can determine specific details (for example, a prediction mode) of the prediction methods. The processing unit subjected to the prediction process may be different from the processing unit of which the prediction method and the specific details are determined. For example, the prediction method and the prediction mode may be determined in the units of PU and the prediction process may be performed in the units of TU.

In the inter prediction, a prediction process is performed on the basis of information on at least one of a previous picture and/or a subsequent picture of a current picture to generate a prediction block. In the intra prediction, a prediction process is performed on the basis of pixel information of a current picture to generate a prediction block.

In the inter prediction, a reference picture is selected for a PU and a reference block with the same size as the PU is selected in the unit of inter pixel samples. Subsequently, a prediction block in which a residual signal from the current PU is minimized and the motion vector magnitude is minimized is generated. In the inter prediction, a skip mode, a merge mode, an MVP (Motion Vector Prediction) mode, and the like can be used. The prediction block may be generated in the unit of pixel samples less than an integer pixel such as ½ pixel samples and ¼ pixel samples. Here, the motion vector also be expressed in the unit of pixel samples less than an integer pixel. For example, luma pixels can be expressed in the unit of ¼ pixels and chroma pixels can be expressed in the unit of ⅛ pixels.

Information such as an index, a motion vector (for example, a motion vector predictor), and a residual signal of a reference picture selected through the inter prediction is entropy-encoded and is transmitted to a decoder.

When the intra prediction is performed, the prediction mode can be determined in the unit of PU and the prediction process can be performed in the unit of PU. Alternatively, the prediction mode may be determined in the unit PU and the inter prediction may be performed in the unit of TU.

The prediction modes in the intra prediction include 33 directional prediction modes and at least two non-directional modes. The non-directional modes include a DC prediction mode and a planar mode.

In the intra prediction, a prediction block can be generated after a filter is applied to a reference sample. At this time, it can be determined whether a filter should be applied to a reference sample depending on the intra prediction mode and/or the size of a current block. At this time, the current block may be a transform unit on which the prediction is performed. On the other hand, "a pixel is used" in this specification means that information of the pixel, for example, a pixel value, is used. For the purpose of convenience for explanation, it should be noted that the expression, "information of a pixel is used" or "a pixel value is used", can be simply described as "a pixel is used". The specific intra prediction method is the same as described later.

A PU has various sizes and shapes. For example, in case of inter prediction, a PU may be blocks having sizes such as 2N×2N, 2N×N, N×2N, and N×N (where N is an integer). In case of intra prediction, a PU may be blocks having sizes such as 2N×2N and N×N (where N is an integer). A PU with a size of N×N can be set to be applied to only a specific case. For example, the PU with a size of N×N can be set to be used for only a smallest CU or can be set to be used for only the intra prediction. In addition to the PUs with the above-mentioned sizes, PUs such as an N×mN block, an mN×N block, a 2N×mN block, and an mN×2N block (where m<1) may be additionally defined and used.

Residual values (a residual block or a residual signal) between the generated prediction block and the original block are input to the transform module 115. The prediction mode information, the motion vector information, and the like used for the prediction are encoded along with the residual values by the entropy encoding module 130 and are transmitted to the decoder.

The transform module 115 performs a transform process on the residual block in the unit of TU and generates transform coefficients. The transform unit in the transform module 115 may be a TU and may have a quad tree structure. The size of the transform unit can be determined within a predetermined largest and smallest size range. The transform module 115 can transform the residual block using DCT (Discrete Cosine Transform) and/or DST (Discrete Sine Transform).

The quantization module 120 can quantize the residual values transformed by the transform module 115 and can generate quantization coefficients. The values calculated by the quantization module 120 can be supplied to the dequantization module 135 and the rearrangement module 125.

The rearrangement module 125 can rearrange the quantization coefficients supplied from the quantization module 120. By rearranging the quantization coefficients, it is possible to enhance the encoding efficiency in the entropy encoding module 130. The rearrangement module 125 can rearrange the quantization coefficients in the form of a two-dimensional block to the form of a one-dimensional vector through the use of a coefficient scanning method. The rearrangement module 125 can enhance the entropy encoding efficiency in the entropy encoding module 130 by changing the order of coefficient scanning on the basis of stochastic statistics of the coefficients transmitted from the quantization module.

The entropy encoding module 130 performs an entropy encoding process on the quantization coefficients rearranged by the rearrangement module 125. Examples of the entropy encoding method include an exponential golomb method, a CAVLC (Context-Adaptive Variable Length Coding) method, and a CABAC (Context-Adaptive Binary Arithmetic Coding) method. The entropy encoding module 130 can encode a variety of information such as residual coefficient information and block type information of a coding unit, prediction mode information, partitioning unit information, prediction unit information, transfer unit information, motion vector information, reference picture information, block interpolation information, and filtering information transmitted from the rearrangement module 125 and the prediction module 110.

The entropy encoding module 130 may give a predetermined change to a parameter set or a syntax to be transmitted, if necessary.

The dequantization module 135 inversely quantizes the values quantized by the quantization module 120. The inverse transform module 140 inversely transforms the values inversely quantized by the inverse quantization module 135. The residual values generated by the dequantization module 135 and the inverse transform module 140 are merged with the prediction block predicted by the prediction module 110 to generate a reconstructed block.

The filter module 145 applies a deblocking filter, an ALF (Adaptive Loop Filter), an SAO (Sample Adaptive Offset) to the reconstructed picture.

The deblocking filter removes a block distortion generated at the boundary between blocks in the reconstructed picture. The ALF performs a filtering process on the basis of the result values of the comparison of the original picture with the reconstructed picture of which the blocks are filtered by the deblocking filter. The ALF may be applied only when high efficiency is necessary. The SAO reconstructs offset differences between the residual blocks having the deblocking filter applied thereto and the original picture and is applied in the form of a band offset, an edge offset, or the like.

On the other hand, the filter module 145 may not perform a filtering process on a reconstructed block used for the inter prediction.

The memory 150 stores the reconstructed block or picture calculated by the filter module 145. The reconstructed block or picture stored in the memory 150 is supplied to the prediction module 110 that performs the inter prediction.

Figure 2:
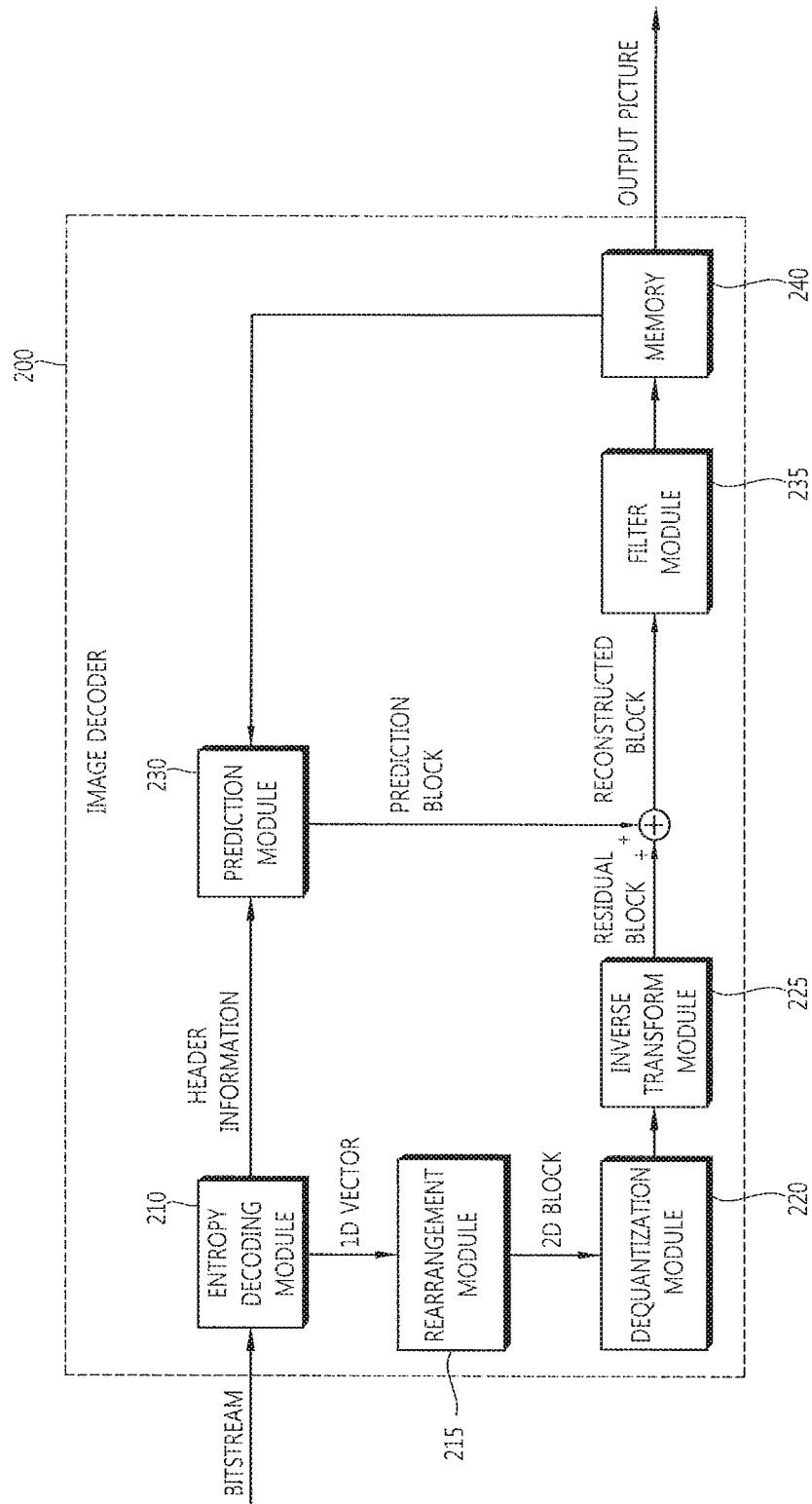
FIG. 2 is a block diagram schematically illustrating an image decoding device according to an embodiment of the invention.

FIG. 2 is a block diagram schematically illustrating an image decoding device according to an embodiment of the invention. Referring to FIG. 2, an image decoding device 200 includes an entropy decoding module 210, a rearrangement module 215, a dequantization module 220, an inverse transform module 225, a prediction module 230, a filter module 235, and a memory 240.

When an image bitstream is input from the image encoding device, the input bitstream is decoded on the basis of the order in which image information is processed by the image encoding device.

For example, when the image encoding device uses a variable length coding (hereinafter, referred to as "VLC") method such as the CAVLC to perform the entropy encoding process, the image decoding module 210 can realize the same VLC table as used in the image encoding device and can perform the entropy decoding process. When the image encoding device uses the CABAC to perform the entropy encoding process, the entropy decoding module 210 can perform the entropy decoding process using the CABAC to correspond thereto.

Information for generating a prediction block out of e information decoded by the entropy decoding module 210 is supplied to the prediction module 230, and the residual values entropy-decoded by the entropy decoding module are input to the rearrangement module 215.

The rearrangement module 215 rearranges the bitstream entropy-decoded by the entropy decoding module 210 on the basis of the rearrangement method in the image encoding device. The rearrangement module 215 reconstructs and rearranges coefficients expressed in the form of one-dimensional vector into coefficients of a two-dimensional block form. The rearrangement module 215 is supplied with information associated with the coefficient scanning performed by the encoding module and can perform the rearrangement using a method of inversely scanning the coefficients on the basis of the scanning order in which the scanning is performed by the corresponding encoding module.

The dequantization module 220 performs dequantization on the basis of the quantization parameters supplied from the encoder and the rearranged coefficient values of the block.

The inverse transform to module 225 performs the inverse DCT and inverse DST of the DCT and DST, which has been performed by the transform module of the image encoding device, on the quantization result from the image encoding device. The inverse transform is performed on the basis of a transfer unit or a division unit of a picture determined by the image encoding device. The transform module of the image encoding device selectively performs the DCT and DST depending on plural information elements such as the prediction method, the size of the current block, and the prediction direction, and the inverse transform module 225 of the image decoding device performs the inverse transform the basis of the transform information on the transform performed by the transform module of the image encoding device.

The prediction module 230 generates a prediction block on the basis of prediction block generation information supplied from the entropy decoding module 210 and the previously-decoded block and/or picture information supplied from the memory 240. The reconstructed block can be generated using the prediction block generated by the prediction module 230 and the residual block provided from the inverse transform module 225. When the prediction mode of a current PU is an intra prediction mode (intra mode), an intra prediction process of generating a prediction block on the basis of pixel information in the current picture can be performed.

When the prediction mode of a current PU is an inter prediction mode (inter mode), an inter prediction process can be performed on the current PU on the basis of information included in at least one of a previous picture or a subsequent picture of the current picture. At this time, motion information necessary for the inter prediction of the current PU supplied from the image encoding apparatus, for example, information on motion vectors, reference picture indices, and the like, can be derived from a skip flag, a merge flag, and the like received from the encoder.

The reconstructed block and/or picture is supplied to the filter module 235. The filter module 235 performs a deblocking filtering process, an SAO (Sample Adaptive Offset) process, and/or an adaptive loop filtering process on the reconstructed block and/or picture.

The memory 240 stores the reconstructed picture or block for use as a reference picture or a reference block and supplies the reconstructed picture to the output module.

When a current block is encoded using the intra prediction, the decoder derives an intra prediction mode of a prediction unit to which the current block belongs and performs a prediction on the current block using the derived intra prediction mode. The decoder checks whether a neighboring block (or neighboring sample) of the current block is a block available for the intra prediction mode and constructs a reference block or a reference pixel to be used in the prediction of the current block. The reference block or the reference pixel which can be used for the intra prediction of the current block may be referred to as a candidate reference block or a candidate reference pixel. A picture close to an original picture can be output by applying the deblocking filtering, the SAO the adaptive loop filtering, and the like to a picture reconstructed through the intra prediction.

In the intra prediction process, the decoder first determines whether I_PCM is applied to the current block. For example, the decoder can determine whether I_PCM is applied to the current block using a flag pcm_flag indicating whether I_PCM is applied. When the value of pcm_flag transmitted from the encoder is 1, the decoder determines that I_PCM is applied to the current block and reconstructs the samples of the current block. The sample values of the block to which PCM (Pulse Coding Modulation) is applied by the encoder is transmitted to the decoder without undergoing prediction, transform, entropy coding, and the like. Therefore, the decoder can decode the current block on the basis of the information transmitted from the encoder.

When the PCM is not applied to the current block (I_PCM), the decoder determines whether the current block is additionally split. For example, the decoder can determine whether the current block is additionally divided using a flag IntraSplitFlag indicating whether the current block is split. The decoder can specify a target block (for example, a prediction unit or a transform unit) on which the prediction can be performed without additional division by determining whether the current block (for example, a coding unit) is additionally split. For example, the decoder performs the prediction using the current coding unit as a prediction unit when the current coding unit is not split (IntraSplitFlag=0), and performs the prediction on the basis of the block obtained by partitioning the current coding unit when the current coding unit is splited (IntraSplitFlag=1).

Figure 3:
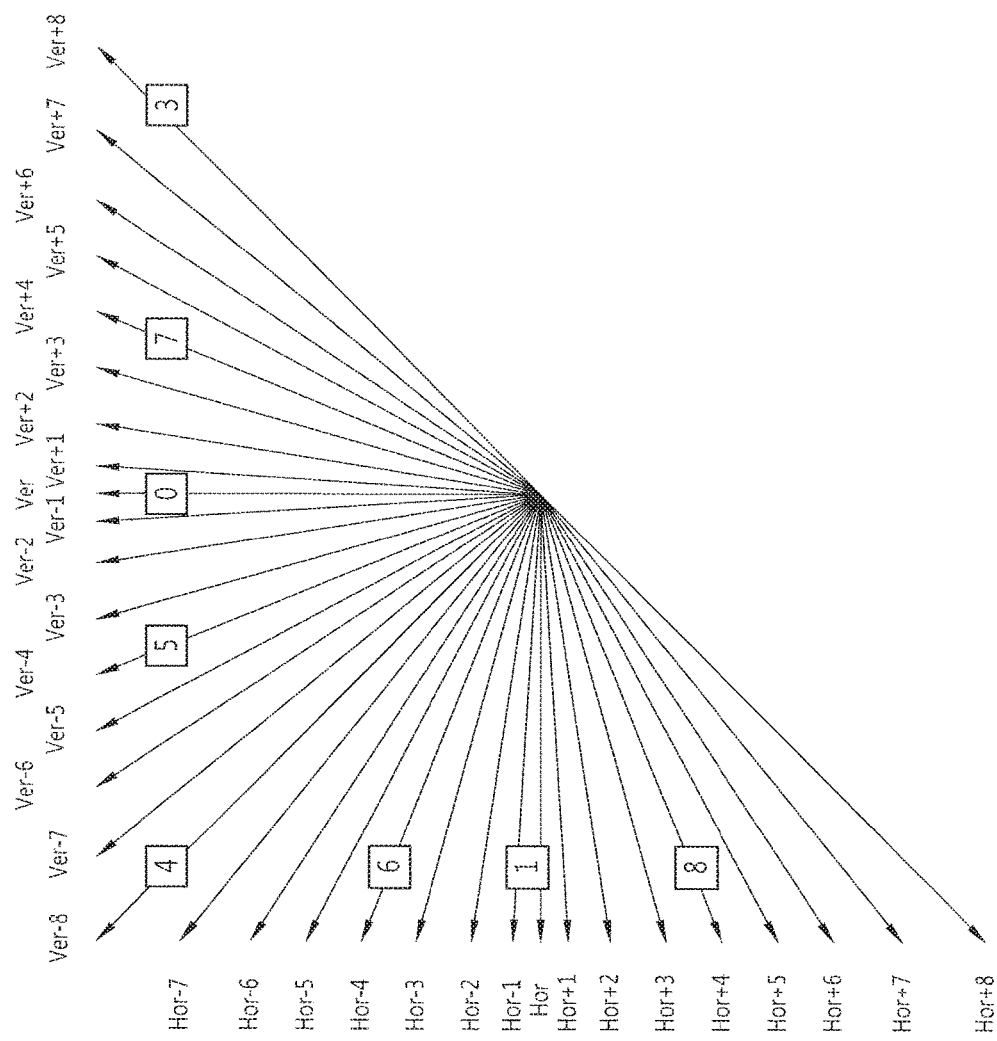
FIG. 3 is a diagram schematically illustrating prediction modes which are used in intra prediction.

FIG. 3 is a diagram schematically illustrating prediction modes used in the intra prediction. Referring to FIG. 3, the intra prediction modes may have prediction directions depending on the positions of the samples (reference pixels) to be referred to. The order of the modes is determined on the basis of the vertical mode or the horizontal mode, and predetermined mode values are assigned depending on the appearance frequencies. For example, numerals in blocks are examples of mode indices (or mode numbers) which are assigned to the prediction modes of the corresponding directions. Prediction modes not having a prediction direction can be used in the intra prediction, in addition to the prediction modes shown in FIG. 3.

Figure 4:
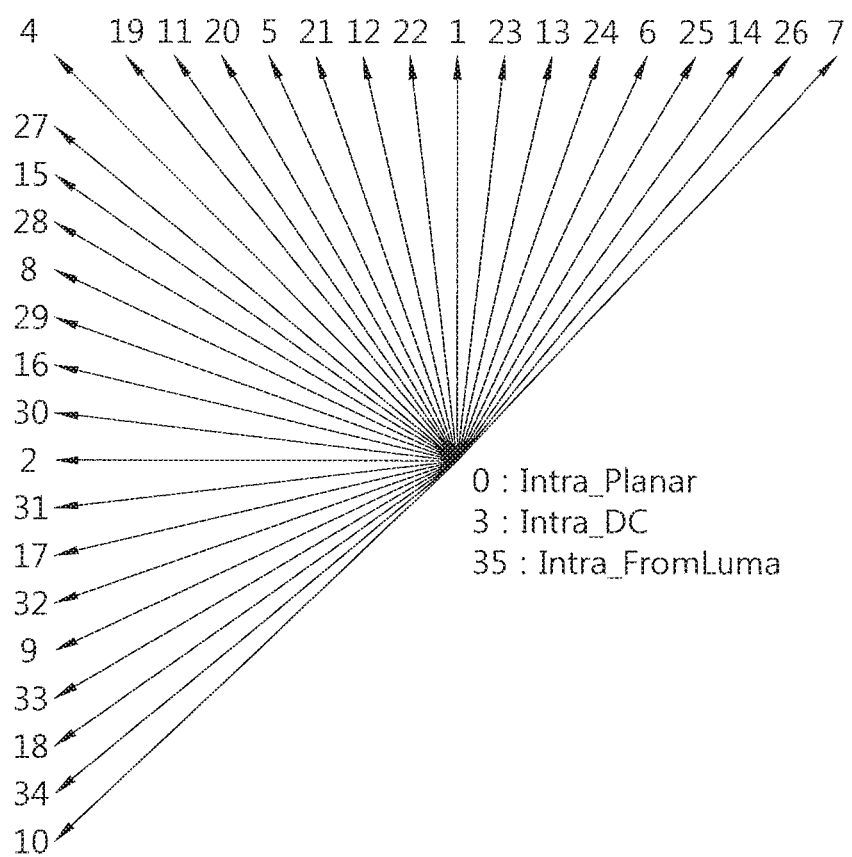
FIG. 4 is a diagram schematically illustrating intra prediction modes.

FIG. 4 is another diagram schematically illustrating the intra prediction modes. In FIG. 4, unlike FIG. 3, the prediction modes are not illustrated on the basis of the horizontal mode or the vertical mode, but the prediction modes are illustrated using mode indices determined in the order of appearance frequencies of the prediction modes. A method of assigning indices depending on the appearance frequencies of the prediction modes can be considered as the method of assigning the indices to the prediction modes. Referring to the mode indices shown in FIG. 4, a planar mode with a mode index of 0 and a DC mode with a mode index of 3 are present as the intra prediction modes not having a prediction direction. A mode index of 35 is assigned to a mode Intra_FromLuma in which the intra prediction mode is determined on the basis of the intra prediction modes of a luma sample in case of a chroma sample. The indices of other prediction modes having directionality are as shown in FIG. 4.

In Table 1, indices to be assigned are schematically arranged when the indices of the intra prediction modes are assigned as shown in FIG. 4.

TABLE 1

| Intra prediction mode | Associated names |
|---|---|
| 0 | Intra_Planar |
| 1 | Intra_Vertical |
| 2 | Intra_Horizontal |
| 3 | Intra_DC |
| Otherwise (4 . . . 34) | Intra_Angular |
| 35 | Intra_FromLuma (used only for chroma) |

Table 2 schematically shows an example where indices are assigned to the prediction modes having a prediction direction out of the intra prediction modes.

TABLE 2

| IntraPredMode [puPartIdx] | IntraPredType [puPartIdx] | IntraPredAngleID [puPartIdx] |
|---|---|---|
| 0 | Intra_Vertical | 0 |
| 1 | Intra_Horizontal | 0 |
| 2 | Intra_DC | — |
| 3 | Intra_Vertical | −8 |
| 4 | Intra_Vertical | −4 |
| 5 | Intra_Vertical | +4 |
| 6 | Intra_Vertical | +8 |
| 7 | Intra_Horizontal | −4 |
| 8 | Intra_Horizontal | +4 |
| 9 | Intra_Horizontal | +8 |
| 10 | Intra_Vertical | −6 |
| 11 | Intra_Vertical | −2 |
| 12 | Intra_Vertical | +2 |
| 13 | Intra_Vertical | +6 |
| 14 | Intra_Horizontal | −6 |
| 15 | Intra_Horizontal | −2 |
| 16 | Intra_Horizontal | +2 |
| 17 | Intra_Horizontal | +6 |
| 18 | Intra_Vertical | −7 |
| 19 | Intra_Vertical | −5 |
| 20 | Intra_Vertical | −3 |
| 21 | Intra_Vertical | −1 |
| 22 | Intra_Vertical | +1 |
| 23 | Intra_Vertical | +3 |
| 24 | Intra_Vertical | +5 |
| 25 | Intra_Vertical | +7 |
| 26 | Intra_Horizontal | −7 |
| 27 | Intra_Horizontal | −5 |
| 28 | Intra_Horizontal | −3 |
| 29 | Intra_Horizontal | −1 |
| 30 | Intra_Horizontal | +1 |
| 31 | Intra_Horizontal | +3 |
| 32 | Intra_Horizontal | +5 |
| 33 | Intra_Horizontal | +7 |

Indices are assigned to IntraPredAngleID, in the order directed to the left or top (minus) side from a reference prediction mode, for example, Intra_Vertical or Intra_Horizontal or in the order directed to the right or bottom (plus) side therefrom.

In Table 1, indices are assigned such as assigning intra prediction mode index of 2 to the DC mode, unlike in FIGS. 3 and 4.

Table 3 schematically shows an example where indices are assigned to the prediction modes having a prediction direction out of the intra prediction modes depending on the intra prediction modes and the intra prediction mode indices shown in FIG. 3.

TABLE 3

| IntraPredMode [puPartIdx] | IntraPredType [puPartIdx] | IntraPredAngleID [puPartIdx] |
|---|---|---|
| 0 | Intra_Vertical | 0 |
| 1 | Intra_Horizontal | 0 |
| 2 | Intra_DC | — |
| 3 | Intra_Vertical | −8 |
| 4 | Intra_Vertical | −8 |
| 5 | Intra_Vertical | −4 |
| 6 | Intra_Vertical | −5 |
| 7 | Intra_Horizontal | −4 |
| 8 | Intra_Horizontal | −4 |
| 9 | Intra_Horizontal | −8 |
| 10 | Intra_Vertical | −6 |
| 11 | Intra_Vertical | −2 |
| 12 | Intra_Vertical | −2 |
| 13 | Intra_Vertical | •6 |
| 14 | Intra_Horizontal | −6 |
| 15 | Intra_Horizontal | −2 |
| 16 | Intra_Horizontal | •2 |
| 17 | Intra_Horizontal | •6 |
| 18 | Intra_Vertical | −7 |
| 19 | Intra_Vertical | −5 |
| 20 | Intra_Vertical | −3 |
| 21 | Intra_Vertical | −1 |
| 22 | Intra_Vertical | •1 |
| 23 | Intra_Vertical | −3 |
| 24 | Intra_Vertical | •5 |
| 25 | Intra_Vertical | •7 |
| 26 | Intra_Horizontal | −7 |
| 27 | Intra_Horizontal | −5 |
| 28 | Intra_Horizontal | −3 |
| 29 | Intra_Horizontal | −1 |
| 30 | Intra_Horizontal | •1 |
| 31 | Intra_Horizontal | −3 |
| 32 | Intra_Horizontal | •5 |
| 33 | Intra_Horizontal | •7 |

The current block on which the prediction is performed can be specified by the position of the top-left corner. For example, the position of the top-left luma sample of the current block (prediction target block) with respect to the top-left luma sample of the current picture can be specified as (xB, yB).

The decoder can specify the prediction mode of a neighboring block or a neighboring sample and derive the intra prediction mode of the current block on the basis thereof. For this purpose, the intra prediction mode (intraPredMode) of a neighboring block of the current block can be specified. When the current block is located at the top edge or the left edge of the current picture, the value of −1 can be assigned to the intra prediction modes of the block which is not available for the intra prediction of the current block, such as the top block and the left block of the current block. The DC mode can be designated for the block other than the intra prediction mode out of the neighboring blocks of the current block. Otherwise, the intra prediction mode of the corresponding neighboring block can be specified with the intra prediction mode used for the corresponding block.

On the other hand, when the size of the prediction unit is very large or small, all the intra prediction modes do not need to be used and only some prediction modes may be used.

Table 4 shows the numbers of intra prediction modes for luma samples which is available depending on the size of the prediction unit out of the intra prediction modes shown in FIG. 3 or 4.

TABLE 4

| log2PUSize | intraPredModeNum |
|---|---|
| 2 | 18 |
| 3 | 35 |
| 4 | 35 |
| 5 | 35 |
| 6 | 4 |

Referring to Table 4, when the size of the prediction unit is 8×8 (log2PUSize=3), when the size of the prediction unit is 16×16 (log2PUSize=4), and when the size of the prediction unit is 32×32 (log2PUSize=5), any one of all the prediction modes can be used for the current block. When the size of the prediction unit is 4×4 (log2PUSize=2) and when the size of the prediction unit 64×64 (log2PUSize=6), any one of some intra prediction modes can be used for the current block. For example, any one of 18 intra prediction modes can be applied to the current block when the size of the prediction unit is 4×4, and any one of 4 intra prediction modes can be applied to the current block when the size of the prediction unit is 64×64.

As described above, the prediction mode of the current block can be derived from the prediction modes of the neighboring blocks. Accordingly, when only some intra prediction modes are used depending on the size, the intra prediction modes of the neighboring blocks needs to be mapped on the intra prediction modes which are available for the current block. At this time, the current block of which the prediction mode should be determined may be a prediction unit as described above.

Table 5 schematically shows an example where the intra prediction modes of the neighboring blocks are mapped on the intra prediction modes used for the current block when all the intra prediction modes are not used for the current block.

TABLE 5

| value | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| mapIntraPredMode4[value] | 0 | 1 | 2 | 3 | 3 | 3 | 1 | 3 | 2 | 2 | 3 | 3 | 1 | 1 | 3 | 3 | 2 |
| mapIntraPredMode10[value] | 0 | 1 | 2 | 3 | 4 | 5 | 6 | 7 | 8 | 9 | 3 | 3 | 3 | 3 | 3 | 3 | 3 |
| value | 17 | 18 | 19 | 20 | 21 | 22 | 23 | 24 | 25 | 26 | 27 | 28 | 29 | 30 | 31 | 32 | 33 | 34 |
| mapIntraPredMode4[value] | 2 | 3 | 3 | 3 | 3 | 1 | 1 | 1 | 3 | 3 | 3 | 3 | 2 | 2 | 2 | 2 | 3 | 3 |
| mapIntraPredMode10[value] | 3 | 3 | 4 | 5 | 5 | 1 | 1 | 6 | 6 | 7 | 4 | 8 | 8 | 2 | 2 | 9 | 9 | 3 |

For example, when the number of prediction modes applicable to the current block is 4, the intra prediction mode corresponding to the prediction mode value of a neighboring block can be specified as the prediction mode which is available for the corresponding neighboring block of the current block using mapItraPredMode4[value].

For example, when the number of prediction modes applicable to the current block is 18, the intra prediction mode corresponding to the prediction mode value of a neighboring block can be specified as the prediction mode which is available for the corresponding neighboring block of the current block using mapItraPredMode0[value].

In the other cases, the intra prediction mode of the corresponding neighboring block is specified as the intra prediction mode which is available for the intra prediction of the current block.

The decoder can construct candidate modes out of the intra prediction modes of the neighboring blocks which can be used for the current block. The candidate modes can be constructed by modes having the highest appearance frequency. For the purpose of convenience for explanation, the candidate modes are called MPM (Most Probable Modes). A predetermined number of MPMs can be selected, for example, two MPMs can be selected.

The MPM may be determined through the prediction process in the encoder information on the MPM may be transmitted to the decoder. Alternatively, information on what intra prediction mode the MPM is may be shared in advance by the encoder and the decoder.

In the example where two MPMs are selected, the decoder may bet a predetermined other prediction mode, for example, an intra prediction mode corresponding to an index of 0 or 3, as the MPM when two MPMs are equal to each other.

The decoder can determine whether any one of the previously-decoded intra prediction modes of the neighboring blocks should be applied to the current block on basis of the information received from the encoder. For example, the encoder can transmit to the decoder a flag indicating whether any one of the intra prediction modes of the neighboring blocks should be applied to the block covering (xB, yB), such as prev_intra_pred_flag[xB][yB], on the basis of the prediction result in the encoder. When the value of prev_intra_pred_flag[xB][yB] received from the encoder is 1, the decoder can determine the prediction mode of the current block on the basis of the information indicating what mode of the candidate intra prediction modes should be applied. For example, the encoder can indicate the MPM as the intra prediction mode to be applied to the current block covering (xB, yB) using mpm_idx[xB][yB].

When the value of prev_intra_pred_flag[xB][yB] is 0, the decoder can determine the intra prediction mode to be applied to the current block out of the modes other than the MPMs. The intra prediction mode to be applied to the current block may be indicated by the encoder. The encoder can indicate the intra prediction mode to be applied to the current block out of the modes other than the MPM using a syntax element such as rem_intra_pred_mode. At this time, since the mode indicating information (rem_intra_pred_mode) is encoded on the basis of the modes other than the MPMs, the intra prediction mode to be applied to the current block may be specified on the basis of the magnitude difference from the MPMs.

For example, it is assumed that the smaller MPM of two MPMs is defined as MPM1 and the large MPM is defined as MPM2. Then, when the value of rem_intra_pred_mode is smaller than the value of MPM 1, the intra prediction mode indicated by the value of rem_intra_pred_mode can be applied to the current block without any change. When the value of rem_intra_pred_mode is larger than or equal to the value of MPM1 and smaller than the value of MPM2, a mode obtained by adding 1 to the intra prediction mode indicated by rem_intra_pred_mode can be applied to the current block. When the value of rem_intra_pred_mode is larger than the value of MPM2, a mode obtained by adding 2 to the intra prediction mode indicated by rem_in a_pred_mode can be applied to the current block.

When the intra prediction mode of the current block is determined, the predicted samples of the current blocks are set to the neighboring pixels (reference pixels) located in the direction of the intra prediction mode. For example, the predicted sample located at the position (x, y) in the current block is set to the reference pixel located at the position (x, −1), that is, the reference pixel neighboring the top of the current block. When the intra prediction mode of the current block is a horizontal mode, the predicted sample located at the position (x, y) in the current block is set to the reference pixel located at the position of (−1, y), that is, the reference pixel neighboring the left side of the current block.

In the intra prediction mode having a prediction direction other than the vertical mode and the horizontal mode, the predicted samples can be set to the corresponding reference pixels depending on the direction of the prediction mode of the current block.

At this time, the pixels neighboring the left side and the top-left corner may be projected to the top and may be used as the reference pixels.

Figure 5:
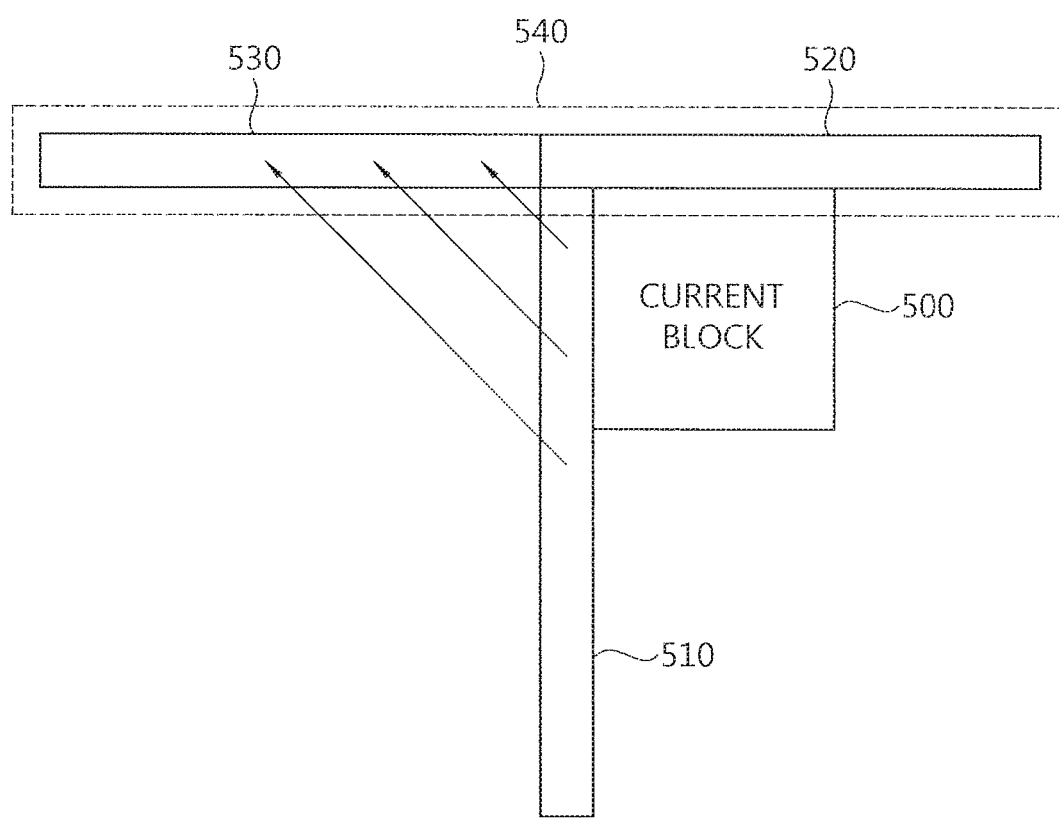
FIG. 5 is a diagram schematically illustrating a method of projecting left-bottom pixels to the top and using the projected pixels as reference pixels.

FIG. 5 is a diagram schematically illustrating a method of projecting the top-left pixel to the top and using the projected pixel as a reference pixel. Referring to FIG. 5, pixels 530 obtained by projecting the positions of samples 510 with a length of 2N neighboring the left side and the top-left side of a current block 500 with a size of N×N onto the array of reference pixels 510 on the top side and the top-right side of the current block 500 can be constructed. At this time, a pixel array with a length of 4N+1 including the top and top-right pixels 520 with a length of 2N+1 and the top-left pixels 530 with a length of 2N is referred to as a main reference array for the purpose of convenience for explanation. The decoder can construct the main reference array and perform the intra prediction on the current block, if necessary, for example, when the bottom-left pixels are not decoded yet.

On the other hand, when at least one of the pixels of a neighboring block is not an unavailable pixel, the unavailable pixels are substituted with other neighboring pixels and then can be used as reference pixels. For example, when any one of the neighboring pixels of the current block is not predicted with an intra prediction mode and the current block is limited to only application of an intra prediction mode, the pixel values of the neighboring pixels can be substituted with other pixels.

For example, when the neighboring pixels are all unavailable pixels, the neighboring pixels can be substituted with the values of lower bit depth.

When any one of the neighboring pixels is an unavailable pixel, the neighboring pixels are searched for an available pixel and the searched available pixel can be substituted for the unavailable pixel. For example, the search can be performed in at least one direction with respect to the unavailable pixel and an available pixel first searched for in a specific search direction can be determined to be the substituent pixel candidate in the corresponding direction. When the available substituent pixel candidate is searched for in plural search directions, the unavailable pixel can be substituted with a combination of two pixel candidates. For example, when two candidates are q and r, the unavailable pixel can be substituted with the value $((q+r+1)>>1)$. When an available substituent candidate pixel is searched for in only one direction, the unavailable pixel can be substituted with the searched available candidate pixel.

As described above, the decoder can construct all reference pixels for generating predicted samples of the current block by substituting the unavailable pixels. The decoder can generate the predicted samples of the current block on the basis of the intra prediction mode of the current block using the constructed reference pixels.

In order to enhance the prediction performance, the decoder may apply the filtering on the reference pixels and then may generate the predicted samples of the current block using the filtered reference pixels.

Figure 6:
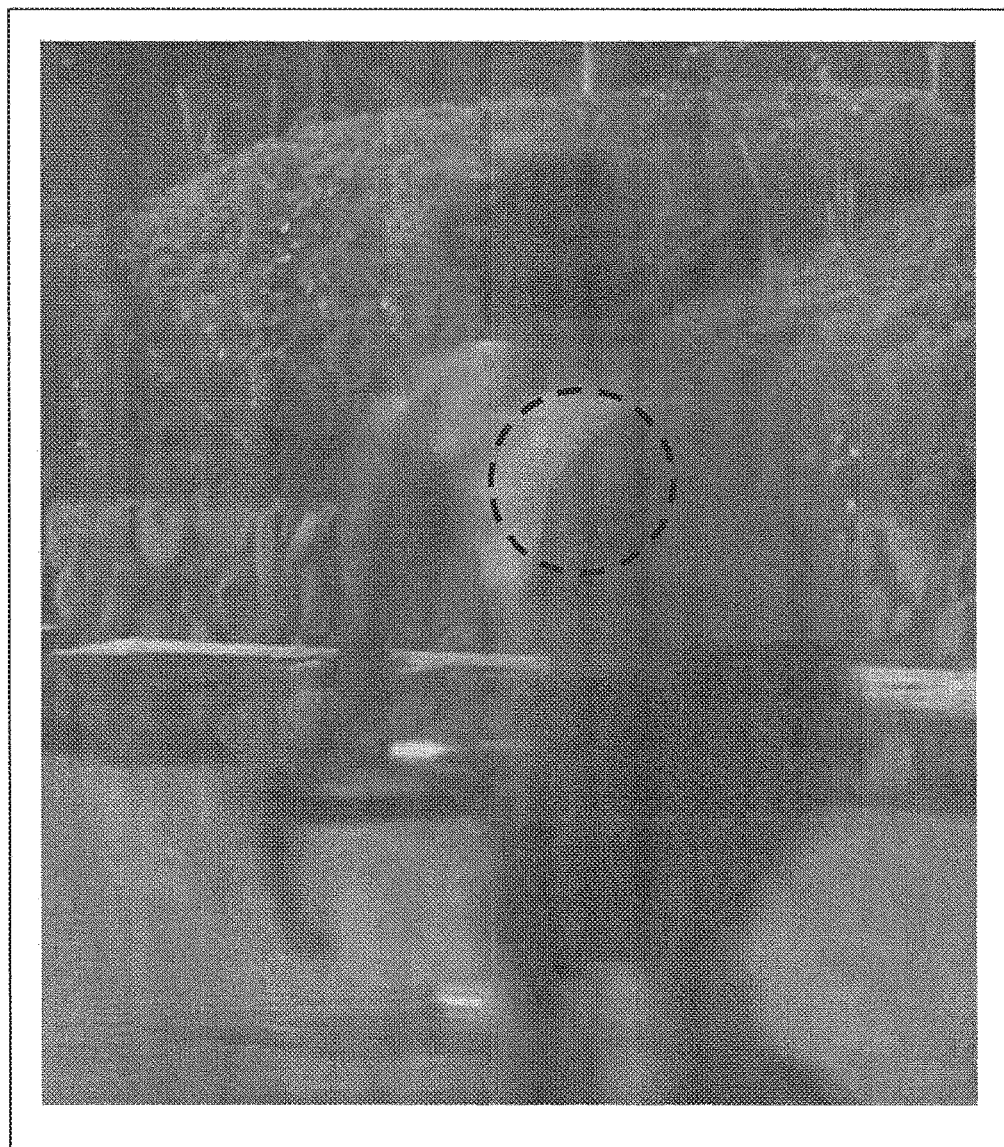
FIG. 6 is a diagram schematically illustrating an example of a method of filtering reference pixels depending on an intra prediction mode and performing an intra prediction process using the filtered pixels.

FIG. 6 is a diagram schematically illustrating an example of a method of filtering reference pixels depending on an intra prediction mode and performing an intra prediction process using the filtered pixels. Referring to FIG. 6, in the prediction modes other than the prediction modes marked by bold arrows, the predicted samples of the current block are generated using samples obtained by performing bilinear interpolation on two pixels around the prediction direction.

On the contrary, in the intra prediction modes in the arrow directions, for example, the intra prediction modes indicated by indices 0, 1, 3, 4, and 9 in FIG. 6 shown using the intra prediction mode indices shown in FIG. 3, the reference pixels in the corresponding prediction direction are copied without interpolation to generate a block (prediction block) of the predicted samples of the current block. As a result, when the intra prediction modes in the prediction directions indicated by the bold arrows in FIG. 6 are applied, artifacts may occur in the reconstructed output picture.

In the example shown in FIG. 6, the indices of the intra prediction modes shown in FIG. 3 are used, but the indicates of the intra prediction modes are used to indicate a specific intra prediction mode in consideration of the directions and characteristics of the intra prediction modes and can be assigned in various ways, as described above. For example, when the indices of the intra prediction modes shown in FIG. 4 are used, the intra prediction modes in the bold arrow directions shown in FIG. 6 include intra prediction mode indices 1, 2, 4, 7, and 10.

Therefore, in order to avoid confusion, the intra prediction mode may be indicated depending on how far the intra prediction mode is from a reference a prediction mode. For example, in FIG. 6, intra prediction mode indices 0 and 1 can be defined as the vertical mode and the horizontal mode, respectively, which are reference intra prediction modes. The intra prediction mode with an index of 3 is the eighth mode to the right side from the vertical mode and thus can be represented by vertical+8 (Ver+8). The intra prediction mode with an index of 4 is an eighth mode to the left side from the vertical mode and thus can be represented by vertical−8 (Ver−8). The intra prediction mode (with an intra prediction mode index of 9) at the left-bottom corner is an eighth mode to the bottom side from the horizontal mode and thus can be represented by horizontal+8 (Hor+8).

On the other hand, in the decoder according to the invention can generate predicted samples by applying interpolation in a specific prediction direction in order to prevent occurrence of the artifacts. Here, "interpolation" is used for the purpose of convenience for explanation and may be referred to as "filtering" or "smoothing" in consideration that it means application of a filtering to a neighboring block of a current block for the purpose of use as reference pixels. As described above, the unit for deriving the intra prediction mode may be a coding unit, and the unit for performing the intra prediction may be a transform unit. Therefore, in the filtering of the neighboring samples described herein, the "current block" may be a transform unit and the neighboring samples to which the filtering is applied may be neighboring samples of the transform unit.

As described above, according to the invention, the filtering may be applied to the reference pixels located in a specific prediction direction before being used as the reference pixels.

For example, it is assumed that a pixel $r(x_r)$ is used as a reference pixel for a sample $c(x_c)$ of the current block. Here, $x_c$ and $x_r$ specify the positions of the corresponding pixels. The decoder can generate $r_m(x_r)$ obtained by modifying the value of $r(x_r)$ through the filtering using a predetermined pixel of $r(x_r-1)$, $r(x_r-2)$, . . . , $r(x_r+1)$, and $r(x_r+2)$ which are the neighboring pixels of $r(x_r)$. The modified value $r_m(x_r)$ is copied to $c(x_c)$ through the filtering.

Here, $x_c$ or $x_r$ is values for indicating the position of a pixel and does not indicate particularly a coordinate in the horizontal direction or a coordinate in the vertical direction. When it is assumed for the purpose of convenience for explanation that $x_c$ or $x_r$ represents a coordinate (x axis coordinate) in the horizontal direction, the invention can be identically applied to the vertical direction as follows.

For example, it is assumed that a pixel $r(y_r)$ is used as a reference pixel for a sample $c(y_c)$ of the current block. Here, $y_c$ and $y_r$ specify the positions of the corresponding pixels. The decoder can generate $r_m(y_r)$ obtained by modifying the value of $r(y_r)$ through the filtering using a predetermined pixel of $r(y_r-1)$, $r(y_r-2)$, . . . , $r(y_r+1)$, and $r(y_r+2)$ which are the neighboring pixels of $r(y_r)$. The modified value $r_m(y_r)$ is copied to $c(y_c)$ through the filtering.

As described above, the method of filtering a neighboring block for use as a reference pixel is hereinafter referred to as "CRSI (Conditional Reference Sample Interpolation)" or "MDIS (Mode Dependent Intra Smoothing)" for the purpose of convenience for explanation. Here, the term "conditional" means that the CRSI can be applied depending on the intra prediction mode and/or the size of a current block, as described later.

When the CRSI is applied, the interpolation is performed using a reference pixel located in the direction passing through a prediction target pixel and the neighboring pixels thereof along the direction of the intra prediction mode direction of the current block.

As described above, the CRSI can be applied to a specific prediction direction. Here, for example, vertical+8, vertical−8, and horizontal+8 can be considered as the specific prediction direction to which the CRSI is applied.

Figure 7:
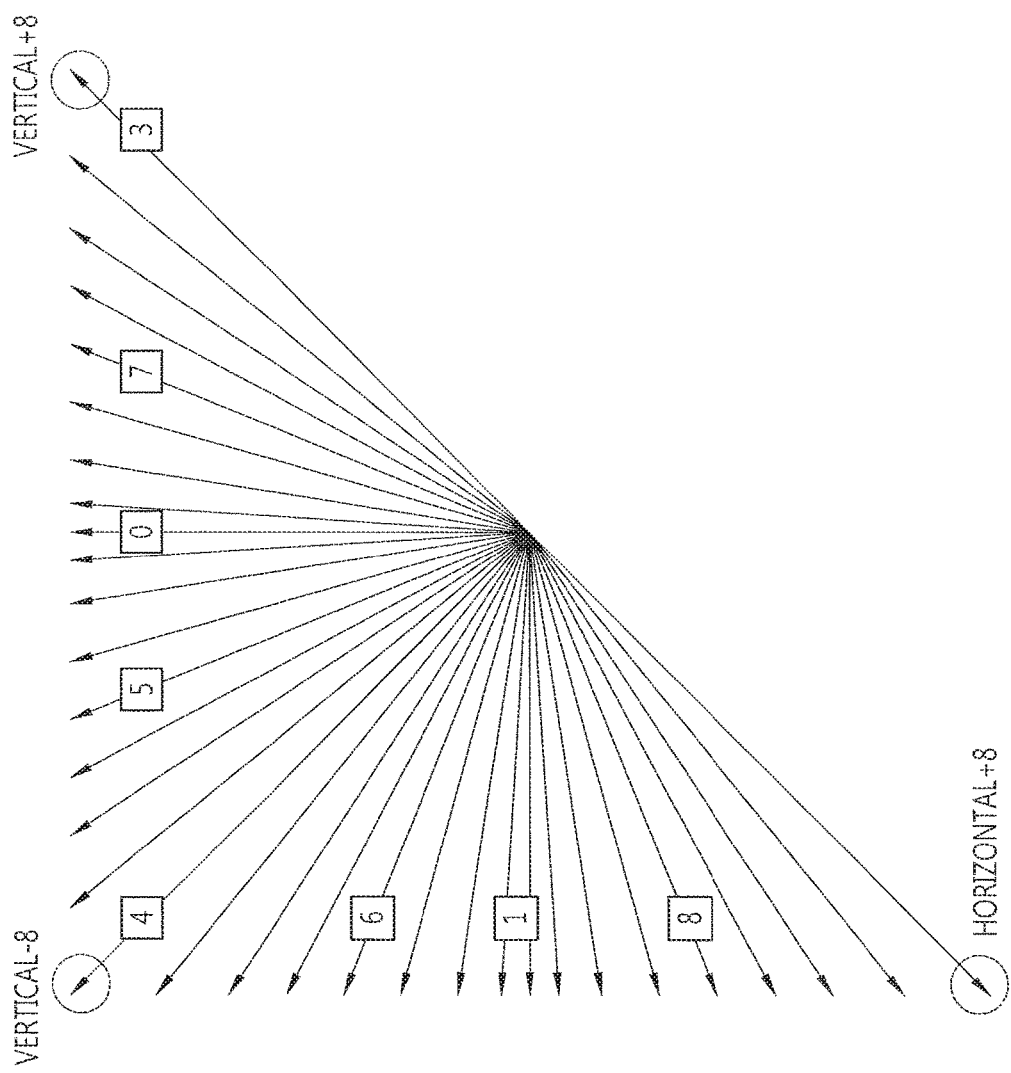
FIG. 7 is a diagram schematically illustrating an example where a target to which a CRSI should be applied is specified in a system according to the invention.

FIG. 7 is a diagram schematically illustrating an example where an application target of the CRSI is specified in the system according to the invention. In the example shown in FIG. 7, the CRSI is applied to the intra prediction modes of vertical+8, vertical−8, and horizontal+8.

Figure 8:
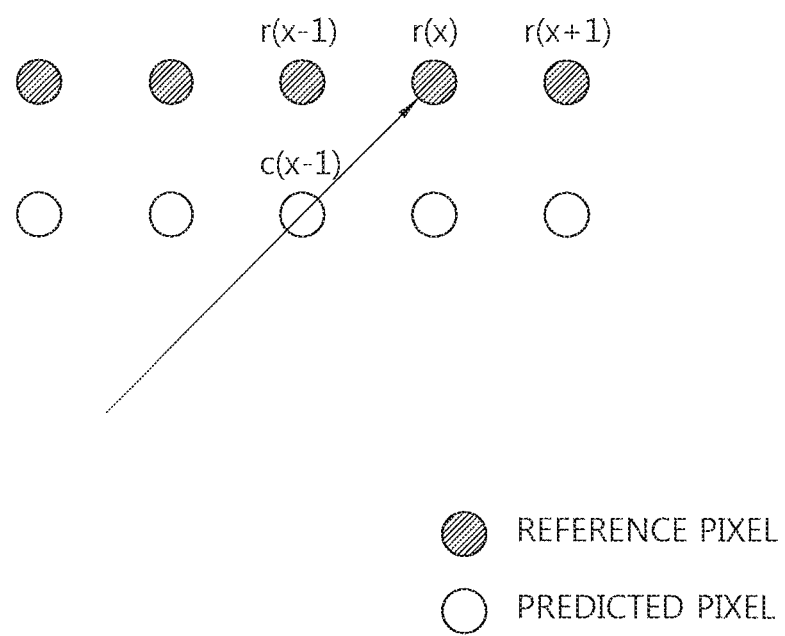
FIG. 8 is a diagram illustrating an example where the CRSI is applied to a vertical+8 mode in the system according to the invention.

FIG. 8 is a diagram illustrating an example where the CRSI is applied to the vertical+8 mode in the system according to the invention. FIG. 8 illustrates an example where the CRSI is performed using a target reference pixel and two reference pixels neighboring the target reference pixel.

In the example shown in FIG. 8, when the CRSI is not applied, the reference pixel $r(x)$ is copied to a sample $c(x-1)$ of the current block along the direction (arrow) of the intra prediction mode. At this time, x−1, x, or the like specifies the position of a pixel.

On the contrary, when the CRSI is applied according to the invention, the pixel value of a reference pixel $r(x)$ is modified through interpolation using two neighboring reference pixels $r(x-1)$ and $r(x+1)$. That is, in the example shown in FIG. 8, the smoothing is performed on the reference pixels using a 3-tap filter. At this time, a predetermined filtering coefficient can be used as the filtering coefficient. The filtering coefficient may be adaptively determined so as to enhance the prediction effect and the artifact removing effect.

Referring to FIG. 8, the reference pixel indicated by the prediction direction passing through the pixel $c(x-1)$ of the current block is $r(x)$ in the intra prediction mode of vertical+8. Therefore, the reference pixel $r(x)$ is modified through the interpolation using $r(x-1)$ and $r(x+1)$. When [1 2 1] is used as the filtering coefficient of the 3-tap filter, a reference pixel $r_m(x)$ obtained by modifying the reference pixel $r(x)$ through the interpolation (filtering) can be generated as expressed by Math 1.

$$r_m(x)=(r(x-1)+2*r(x)+r(x\ 1)+2)>>2 \qquad \text{Math 1}$$

Therefore, when the prediction mode of vertical+8 is applied, the pixel $c(x-1)$ of the current block has the value expressed by Math 2 by copying $r_m(x)$.

$$c(x-1)=(r(x-1)+2*r(x)+r(x+1)+2)>>2 \qquad \text{Math 2}$$

Figure 9:
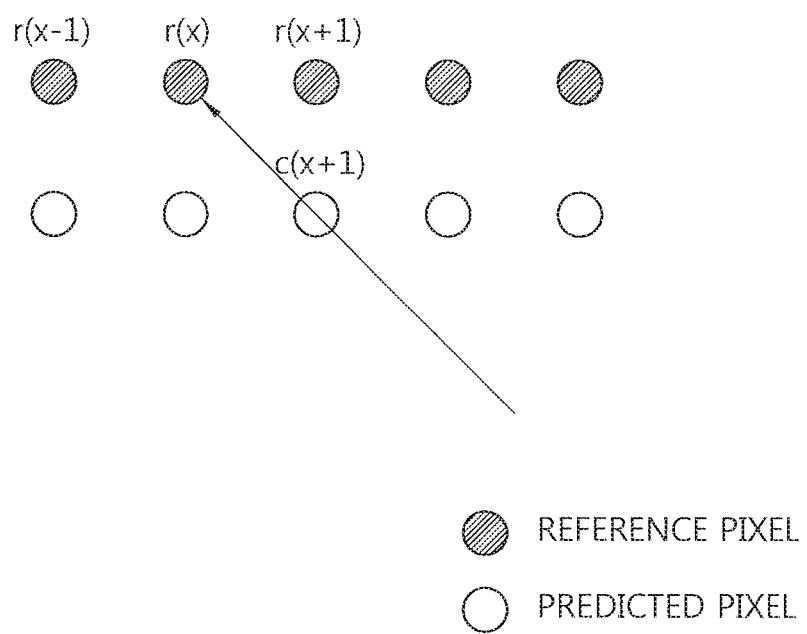
FIG. 9 is a diagram illustrating an example where the CRSI is applied to a vertical−8 mode in the system according to the invention.

FIG. 9 is a diagram illustrating an example where the CRSI is applied to a vertical−8 mode in the system according to the invention. FIG. 9 illustrates an example where the CRSI is performed using a target reference pixel located on the top side of the current block and two reference pixels neighboring the target reference pixel.

Referring to FIG. 9, the reference pixel indicated by the prediction direction passing through the pixel $c(x+1)$ of the current block is $r(x)$ in the intra prediction mode of vertical−8. When [1 2 1] is used as the filtering coefficient of the 3-tap filter, a modified reference pixel $r_m(x)$ can be generated as expressed by Math 3.

$$r_m(x)=(r(x-1)+2*r(x+1)+2)>>2 \qquad \text{Math 3}$$

Therefore, when the prediction mode of vertical−8 is applied to the current block, the pixel $c(x+1)$ of the current block has the value expressed by Math 4 by copying $r_m(x)$.

$$c(x+1)=(r(x-1)+2*r(x)+r(x+1)+2)>>2 \qquad \text{Math 4}$$

On the other hand, referring to FIG. 7, the neighboring samples referred to in the intra prediction mode of vertical−8 may include the neighboring samples on the left side in addition to the neighboring samples on the top side.

Figure 10:
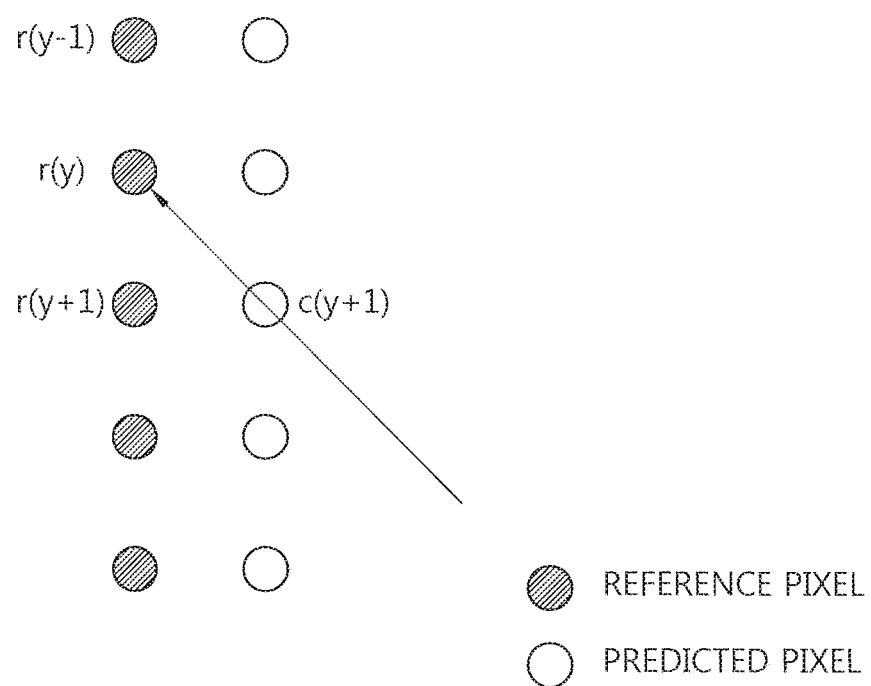
FIG. 10 is a diagram illustrating another example where the CRSI is applied to the vertical−8 mode in the system according to the invention.

FIG. 10 is a diagram illustrating another example where the CRSI is applied to a vertical−8 mode in the system according to the invention. FIG. 10 illustrates an example where the CRSI is performed using a target reference pixel located on the left side of the current block and two reference pixels neighboring the target reference pixel.

As described above, x in Math 1 to 4 is a value for indicating the position of a pixel and does not indicate particularly a coordinate in the horizontal direction or a coordinate in the vertical direction. When it is assumed for the purpose of convenience for explanation that x in Math 1 to 4 represents a coordinate (x axis coordinate) in the horizontal direction, the invention can be identically applied to the vertical direction as follows.

Referring to FIG. 10, the reference pixel indicated by the prediction direction passing through the pixel $c(y+1)$ of the current block is $r(x)$ the intra prediction mode of vertical−8. When [1 2 1] is used as the filtering coefficient of the 3-tap filter, a modified reference pixel $r_m(y)$ can be generated as expressed by Math 5.

$$r_m(y)=(r(y-1)+2*r(y)+r(y+1)+2)>>2 \qquad \text{Math 5}$$

Therefore, when the prediction mode of vertical−8 is applied to the current block, the pixel c(y+1) of the current block has the value expressed by Math 6 by copying $r_m(y)$.

$$c(y+1)=(r(y-1)+2*r(y)+r(y+1)+2)>>2 \qquad \text{Math 6}$$

Figure 11:
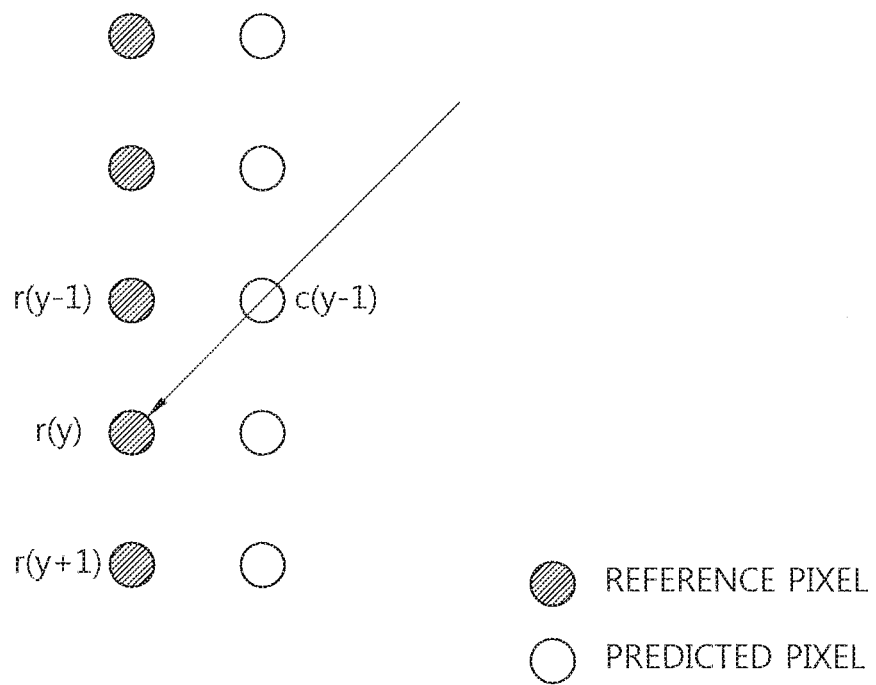
FIG. 11 is a diagram illustrating an example where the CRSI is applied to a horizontal+8 mode in the system according to the invention.

FIG. 11 is a diagram illustrating an example where the CRSI is applied to the horizontal+8 mode in the system according to the invention. FIG. 11 illustrates an example where the CRSI is performed using a target reference pixel and two reference pixels neighboring the target reference pixel.

Referring to FIG. 11, the reference pixel indicated by the prediction direction passing through the pixel c(y−1) of the current block is r(y) in the intra prediction mode of horizontal+8. When [1 2 1] is used as the filtering coefficient of the 3-tap filter, a modified reference pixel $r_m(y)$ can be generated as expressed by Math 7.

$$r_m(y)=(r(y-1)+2*r(y)+r(y-1)+2)>>2 \qquad \text{Math 7}$$

Therefore, when the prediction mode of horizontal+8 is applied to the current block, the pixel c(y−1) of the current block has the value expressed by Math 6 by copying $r_m(y)$.

$$c(y-1)=(r(y-1)+2*r(y)+r(y+1)+2)>>2 \qquad \text{Math 8}$$

The method using a 3-tap filter may be applied by extending the number of filtering taps. For example, a reference pixel may be modified through the interpolation using five pixels located in the direction of an intra prediction mode and the modified reference pixel may be copied to a pixel of a current block along the direction of the prediction mode.

Figure 12:
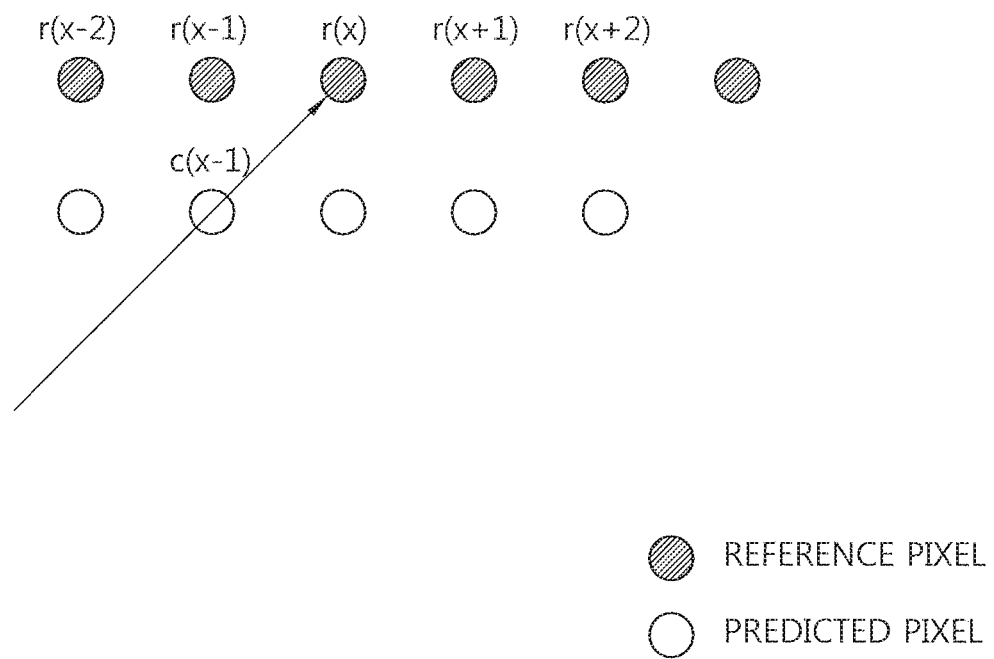
FIG. 12 is a diagram illustrating another example where the CRSI is applied to the vertical+8 mode in the system according to the invention.

FIG. 12 is a diagram illustrating an example where the CRSI is applied to a vertical+8 mode in the system according to the invention. FIG. 12 illustrates an example where the CRSI is performed using a target reference pixel located on the top side of the current block and four reference pixels neighboring the target reference pixel.

Referring to FIG. 12, the reference pixel indicated by the prediction direction passing through the pixel c(x−1) of the current block is r(x) in the intra diction mode of vertical+8 when [1 2 4 2 1] is used as the filtering coefficient of the 5-tap filter, a modified reference pixel $r_m(x)$ can be generated as expressed by Math 9.

$$r_m(x)=(r(x-2)+2*r(x-1)+4*r(x)+2*r(x+1)+r(x+2)+5)/10 \qquad \text{Math 9}$$

Therefore, when the prediction mode of vertical+8 is applied to the current block as show in FIG. 12, the pixel c(x−1) of the current block has the value expressed by Math 10 by copying $r_m(x)$.

$$c(x-1)=(r(x-2)+2*r(x-1)+4*r(x)+2*r(x+1)+r(x+2)+5)/10 \qquad \text{Math 10}$$

Figure 13:
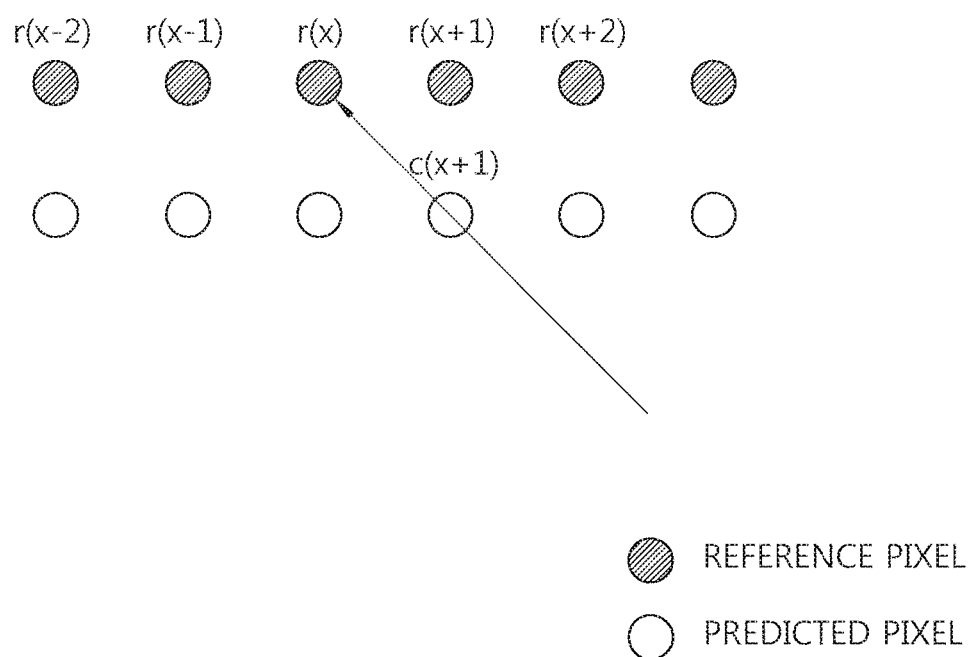
FIG. 13 is a diagram illustrating another example where the CRSI is applied to the vertical+8 mode in the system according to the invention.

FIG. 13 is a diagram illustrating an example where the CRSI is applied to a vertical−8 mode in the system according to the invention. FIG. 13 illustrates an example where the CRSI is performed using a target reference pixel located on the top side of the current block and four reference pixels neighboring the target reference pixel.

Referring to FIG. 13, the reference pixel indicated by the prediction direction passing through the pixel c(x+1) of the current block is r(x) in the intra prediction mode of vertical−8. When [1 2 4 2 1] is used as the filtering coefficient of the 5-tap filter, a modified reference pixel $r_m(x)$ can be generated as expressed by Math 11.

$$r_m(x)=(r(x-2)+2*r(x-1)+4*r(x)+2*r(x+1)+r(x+2)+5)/10 \qquad \text{Math 11}$$

Therefore, when the prediction mode of vertical+8 applied to the current block as show in FIG. 13, the pixel c(x+1) of the current block has the value expressed by Math 12 by copying $r_m(x)$.

$$c(x+1)=(r(x-2)+2*r(x-1)+4*r(x)+2*r(x+1)+r(x+2)+5)/10 \qquad \text{Math 12}$$

Figure 14:
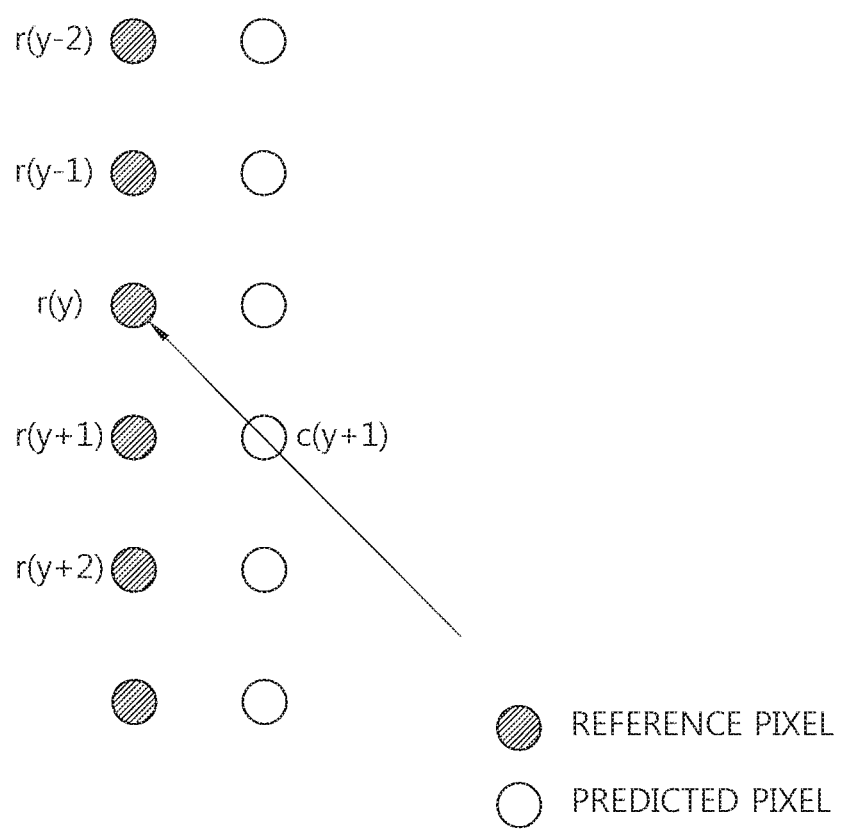
FIG. 14 is a diagram illustrating another example where the CRSI is applied to the vertical−8 mode in the system according to the invention.

FIG. 14 is a diagram illustrating another example where the CRSI is applied to a vertical−8 mode in the system according to the invention. FIG. 14 illustrates an example where the CRSI is performed using a target reference pixel located on the left side of the current block and four reference pixels neighboring the target reference pixel.

Referring to FIG. 14, the reference pixel indicated by the prediction direction passing through the pixel c(y+1) of the current block is r(y) in the intra prediction mode of vertical−8. When [1 2 4 2 1] is used as the filtering coefficient of the 5-tap filter, a modified reference pixel $r_m(y)$ can be generated as expressed by Math 13.

$$r_m(y)=(r(y-2)+2*r(y-1)+4*r(y)+2*r(y+1)+r(y+2)+5)/10 \qquad \text{Math 13}$$

Therefore, when the prediction mode of vertical−8 is applied to the current block as show in FIG. 14, the pixel c(y−1) of the current block has the value expressed by Math 14 by copying $r_m(y)$.

$$c(y+1)=(r(y-2)+2*r(y-1)+4*r(y)+2*r(y+1)+r(y+2)+5)/10 \qquad \text{Math 14}$$

Figure 15:
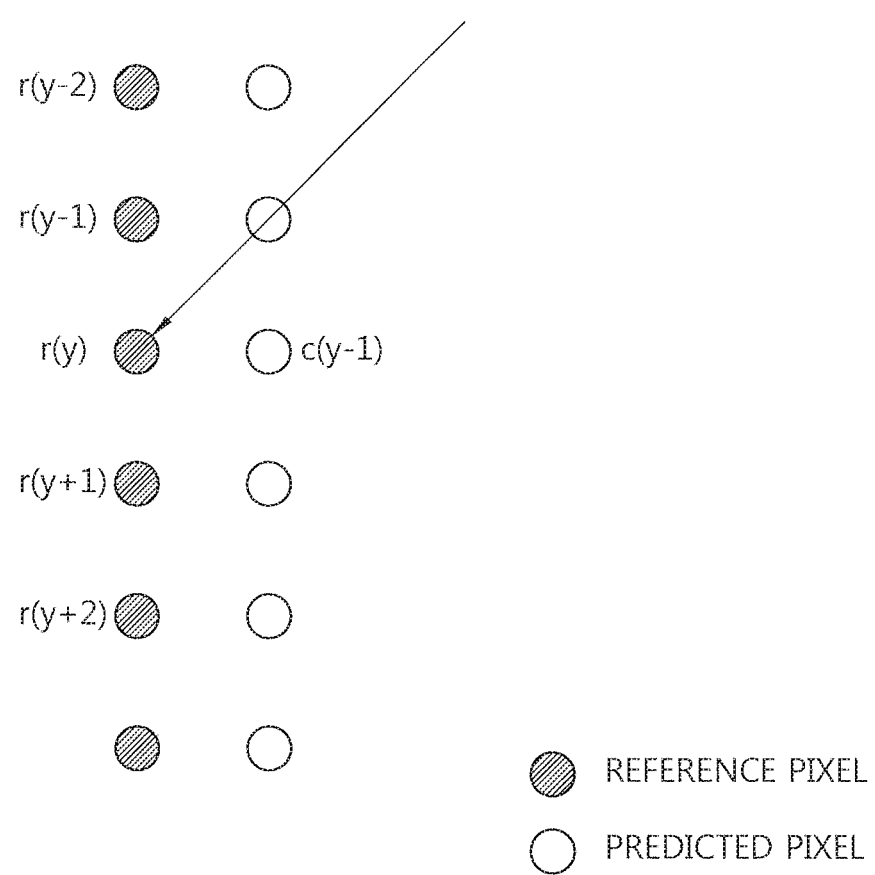
FIG. 15 is a diagram illustrating another example where the CRSI is applied to the horizontal+8 mode in the system according to the invention.

FIG. 15 is a diagram illustrating an example where the CRSI is applied to the horizontal+8 mode in the system according to the invention. FIG. 15 illustrates an example where the CRSI is performed using a target reference pixel and two reference pixels neighboring the target reference pixel.

Referring to FIG. 15, the reference pixel indicated by the prediction direction passing through the pixel c(y−1) of the current block is r(y) in the intra prediction mode of horizontal+8. When [1 2 4 2 1] is used as the filtering coefficient of the 5-tap filter, a modified reference pixel $r_m(y)$ can be generated as expressed by Math 15.

$$r_m(y)=(r(y-2)+2*r(y-1)+4*r(y)+2*r(y+1)+r(y+2)+5)/10 \qquad \text{Math 15}$$

Therefore, when the prediction mode of vertical−8 is applied to the current block as show in FIG. 15, the pixel c(y−1) of the current block has the value expressed by Math 16 by copying $r_m(y)$.

$$c(y-1)=(r(y-2)+2*r(y-1)+4*r(y)+2*r(y+1)+r(y+2)+5)/10 \qquad \text{Math 16}$$

In the examples of Math 1 to 16, the pixels located the boundaries with the neighboring samples and located in the prediction direction of the intra prediction mode out of the pixels of the current block are predicted from the filtered neighboring samples (modified reference samples). These examples use the pixels as a prediction target for the purpose of easy understanding of the invention, and the invention is not limited thereto. As in known intra prediction methods, other pixels in the current block may be predicted on the basis of the modified reference samples in the same way depending on the intra prediction direction.

In the examples of Math 1 to 16, the filtering coefficient (weight value) used in the CRSI has a predetermined value, for example, a filtering coefficient of [1 2 1] a rounding offset of 2, and a division magnitude of 2 in case of the 3-tap filter, and a filtering coefficient of [1 2 4 2 1], a rounding offset of 5, and a denominator of 10 in case of the 5-tap filter. In general, the rounding offset corresponds to half the division (or shift) magnitude.

In this regard, a method of using a filter having a filtering coefficient (weight value) other than [1 2 1]/[1 2 4 2 1] for the CRSI may be considered. For example, the filtering coefficient may be adaptively determined. At this time, the adaptively-determined value of the filtering coefficient (weight value) is determined by the encoder and transmitted to the decoder. The decoder may derive the filtering coefficient (weight value) using neighboring pixels or context.

In an example of the method of deriving the filtering coefficient using the neighboring pixels, a reconstructed picture is analyzed and the filtering coefficient of the above-mentioned sample smoothing filter (CRSI) is changed when the sample value difference between the reference pixels is larger than a predetermined reference value. For example, the predicted samples can be calculated by giving a small weight to the pixels over the boundary having a large filter value difference and giving a large weight to the other pixels.

A case where there is no neighboring pixel to be used in the interpolation of the reference pixels in the CRSI can be considered. For example, when the size of the current block is nS×nS and r(x)=r(nS) or r(y)=r(nS) is established, the CRSI may not be applied and r(x) or r(y) may be used as the reference pixel.

Referring to FIG. 4, the CRSI is applied when the intra prediction mode is 4, 7, and 10, but the invention is not limited to this case. The CRSI can be applied to the intra prediction modes in the same way to perform the prediction.

On the other hand, it may be determined whether the CRSI should be applied in the intra prediction process of the decoder, in consideration of the size of the current block and/or the intra prediction mode of the current block. For example, it can be determined whether the CRSI should be applied, depending on the size and the intra prediction mode of the current block. A kind of table may be used to determine whether the CRSI should be applied for various intra prediction modes and various block sizes. As the value indicating whether the CRSI should be applied, that is, whether the filtering should be performed to the reference pixels, information such as intraFilterType which indicates whether a filtering should be applied by filter types may be constructed, the CRSI may be applied when the value of intraFilterType is 1, and the CRSI may not be applied when the value of intraFilterType is 0. At this time, the value of intraFilterType can be determined depending on the size and the intra prediction mode of the current block.

As described above, it can be determined whether the CRSI should be applied to the intra prediction modes (indices) of 4, 7, and 10, depending on the size of the current block, as shown in Table 6.

On the other hand, it is hitherto described that the CRSI is applied to the reference pixels in consideration of only one of the x coordinate and the y coordinate along with the accompanying drawings for the purpose of convenience for explanation, but it may be described that the CRSI is applied to the reference pixels in consideration of both x and y coordinates. In Math 17, the details described with reference to Maths 1, 3, 5, and 7 are arranged when a 3-tap filter is applied. In Math 17, it is assumed that the position of the top-left corner in the current block is set to (0, 0) and the size of the current block is nS×nS, for the purpose of convenience for explanation.

$$r_m(x, -1) = (r(x+1, -1) + 2*r(x, -1) + r(x-1, -1) + 2) >> 2,$$
$$x = 0, \ldots, nS*2-2$$

$$r_m(-1, y) = (r(-1, y+1) + 2*r(-1, y) + r(-1, y-1) + 2) >> 2,$$
$$y = 0, \ldots, nS2-2 \qquad \text{Math 17}$$

In Math 17, when there is no pixel on the left and right sides and the top and bottom sides of a reference pixel to be used in the interpolation, the reference pixel can be used without any change as described above. Therefore, $r_m(nS*2-1, -1) = r(nS*2-1, -1)$ and $r_m(-1, nS*2-1) = r(-1, nS*2-1)$ can be set.

The reference pixel r(−1, −1) neighboring the top-left corner of the current block can be filtered as expressed by Math 18 using the right pixel r(0, −1) and the bottom pixel r(−1, 0) of r(−1, −1).

$$r_m(-1, -1) = (r(-1, 0) + 2*r(-1, -1) + r(0, -1) + 2) >> 2 \qquad \text{Math 18}$$

The above-mentioned CRSI may be referred to as MDIS (Mode Dependent intra Smoothing) in that smoothing is performed on a reference pixel depending on the intra prediction mode. Before performing the intra prediction, the neighboring samples of the current block are filtered using the MDIS as described above. At this time, all the (4N+1) reference pixels are filtered.

Figure 16:
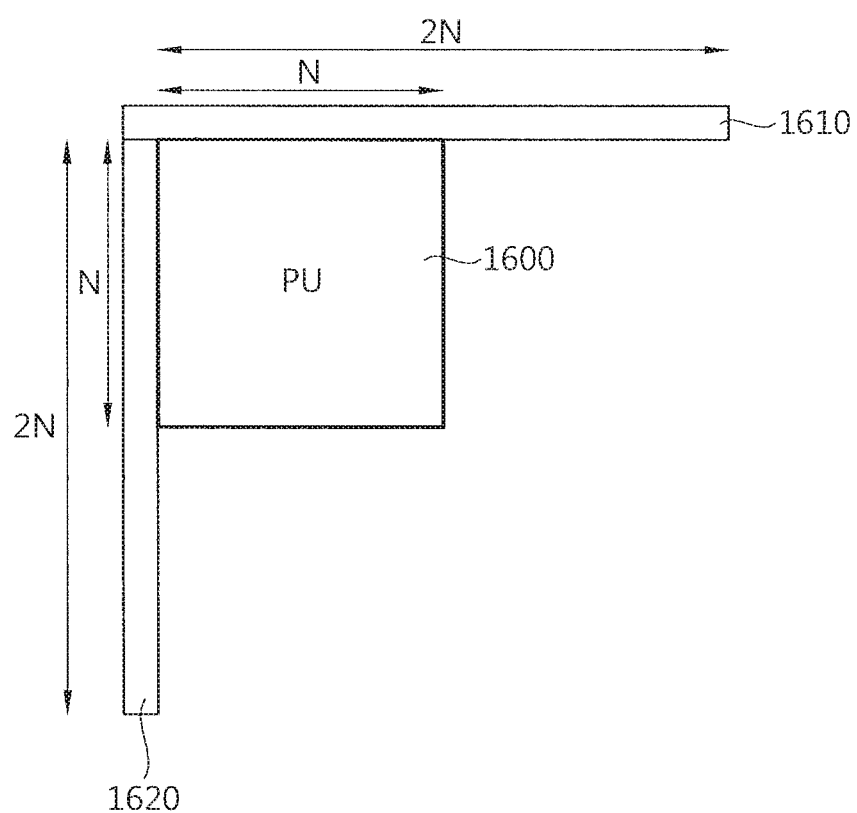
FIG. 16 is a diagram schematically illustrating applying of an MDIS to filter reference pixels before performing a prediction process of taking the values of the reference pixels as pixel values of a current block.

FIG. 16 is a diagram schematically illustrating example where reference pixels are filtered using the MDIS before performing the prediction of taking the values of the reference pixels as the pixel values of the current block in the process of intra prediction.

Referring to FIG. 16, as reference pixels neighboring a current block 1600 with a size of N×N, samples 1610 with a length of 2N on the top side and the top-right side, samples 1620 with a length of 2N on the left side and the bottom-left side, and a sample neighboring the top-left side of the current block 1600 are target pixels to be filtered before the prediction as described above.

However, in the actual intra prediction process, only a part of (4N+1) neighboring samples are used as the reference block depending on the intra prediction mode of the current

TABLE 6

| IntraPredMode | intraFilterType (4 × 4 PU) | intraFilterType (8 × 8 PU) | intraFilterType (16 × 16 PU) | intraFilterType (32 × 32 PU) | intraFilterType (64 × 64 PU) |
|---|---|---|---|---|---|
| 4 | 0 | 0 | 1 | 1 | 0 |
| 7 | 0 | 0 | 1 | 1 | 0 |
| 10 | 0 | 0 | 1 | 1 | 0 |

The example of Table 6 may be considered as an example where it is determined whether the CRSI should be applied using a criterion that the CRSI should not be applied to an excessively small block or an excessively large block.

block. Therefore, when all the neighboring blocks are filtered regardless of the intra prediction mode of the current block, the decoding complexity can be greatly increased. In this regard, a method of filtering only predetermined samples to correspond to the intra prediction mode of the current block out of the neighboring samples of the current block can be considered.

Figure 17:
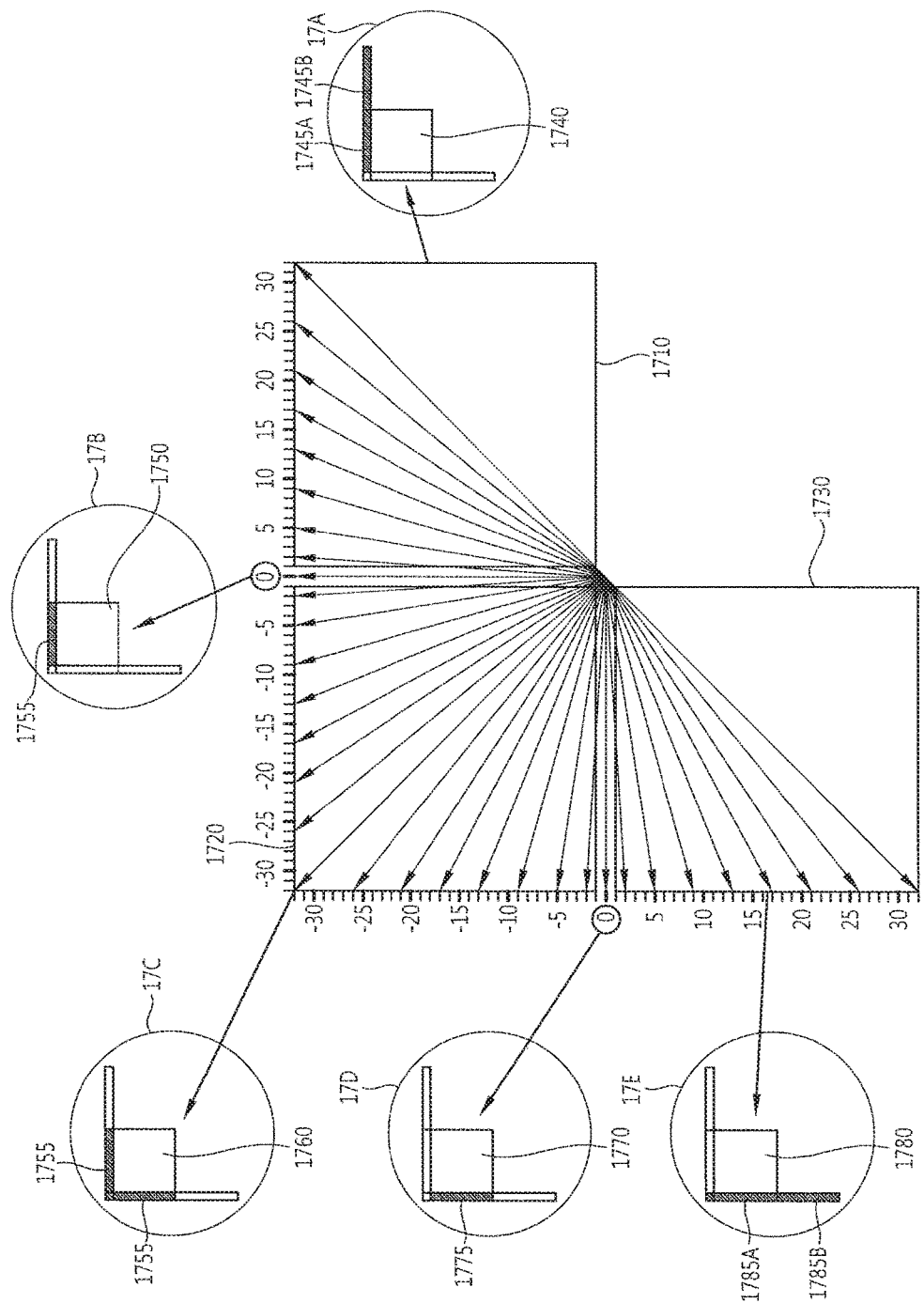
FIG. 17 is a diagram schematically illustrating neighboring samples of a current block which are used as reference pixels after being filtered on the basis of an intra prediction mode of the current block in the system according to the invention.

FIG. 17 is a diagram schematically illustrating neighboring samples of the current block which are used as reference pixels after being filtered depending on the intra prediction mode of the current block in the system according to the invention. Referring to FIG. 17, when the prediction direction of the intra prediction mode is the right direction of the vertical mode (1710), neighboring samples 1745A located on the top side of a current block 1740 and neighboring samples 1745B located on the top-left side are used to predict current block 1740 as show in 17A.

When the intra prediction mode is the vertical mode, neighboring samples 1755 located on the top side of a current block 1750 are used to predict the current block 1750 as shown in 17B.

When the prediction direction of the intra prediction mode is the left direction of the vertical mode and the top direction of the horizontal mode (1720), neighboring samples 1765A located on the top side of a current block 1760, neighboring samples 1765B located on the left side, and a neighboring sample neighboring the top-left side of the current block 1760 are used to predict the current block 1760 as shown in 17C.

When the intra prediction mode is the horizontal mode, neighboring samples 1775 located on the left side of a current block 1770 are used to predict the current block 1770 as shown in 17D.

When the prediction direction of the intra prediction mode is the bottom direction of the horizontal mode (1730), neighboring samples 1785A located on the left side of a current block 1780, neighboring samples 1785B located on the bottom-left side, and a neighboring sample neighboring the top-left side of the current block 1780 are used to predict the current block 1780 as shown in 17E.

Therefore, referring to FIG. 17, the number of neighboring samples used as the reference pixel in the actual intra prediction is smaller than half the total number of neighboring samples. Accordingly, it is possible to greatly reduce the complexity of the MDIS by performing the filtering on the neighboring samples of the current block in consideration of the intra prediction mode of the current block.

According to the invention, only a part of the neighboring samples may be filtered using the MDIS depending on the intra prediction mode of the current block. As described above, the main reference array which is an array of reference pixels may be set depending on the intra prediction mode intraPredMode.

Figure 18:
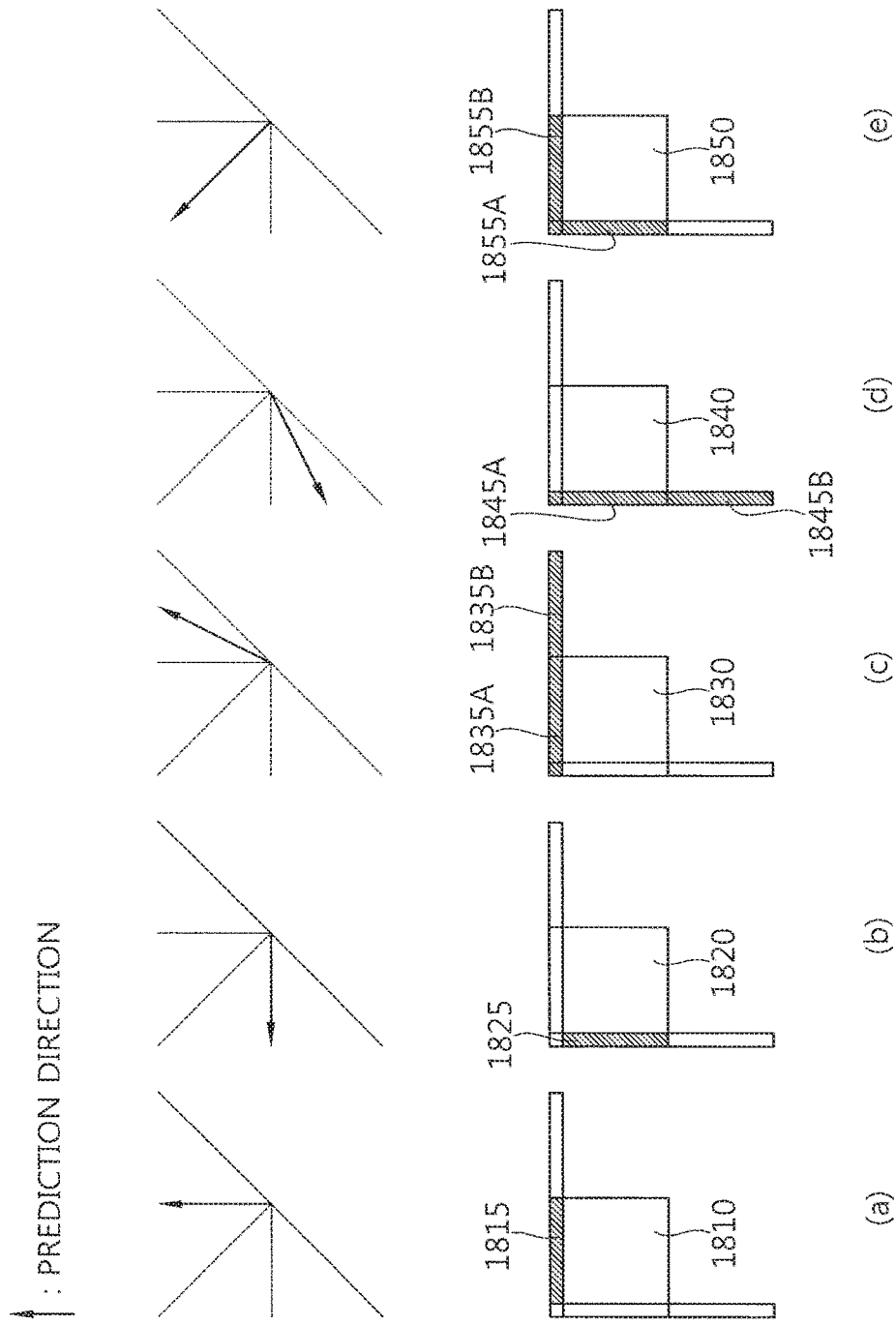
FIG. 18 is a diagram schematically illustrating neighboring samples which are filtered on the basis of an intra prediction mode of a current block in the system according to the invention.

FIG. 18 is a diagram schematically illustrating neighboring samples to be filtered depending on the intra prediction mode of a current block in the system according to the invention.

Referring to FIG. 18(a), when the intra prediction mode of a current block is the vertical mode, samples 1915 located on the top side of a current block 1810 are to be filtered.

Referring to FIG. 18(b), when the intra prediction mode of a current block is the horizontal mode, samples 1825 located on the left side of a current block 1820 are to be filtered.

Referring to FIG. 18(c), when the prediction direction of the intra prediction mode of a current block 1830 is the right direction of the vertical mode, neighboring samples 1835A located on the top side of a current block 1830, neighboring samples 1835B located on the top-right side, and a neighboring sample neighboring the top-left corner of the current block 1830 are to be filtered.

Referring to FIG. 18(d), when the prediction direction of the intra prediction mode of a current block 1840 is the bottom direction of the horizontal mode, neighboring samples 1845A located on the left side of a current block 1840, neighboring samples 1845B located on the bottom-left side, and a neighboring sample neighboring the top-left corner of the current block 1840 are to be filtered.

Referring to FIG. 18(e), when the prediction direction of the intra prediction mode of a current block 1850 is the left direction of the vertical mode or the top direction of the horizontal mode, neighboring samples 1855A located on the op side of a current block 1850, neighboring samples 1855B located on the left side, and a neighboring sample neighboring the top-left corner of the current block 1850 are to be filtered.

Therefore, when the current block has a size of N×N and all the neighboring samples are filtered, 4N+1 neighboring samples are filtered, except when the intra prediction mode of the current block is the DC mode. On the contrary, when the filtering target is set in consideration of the intra prediction mode of the current block according to the invention as shown in FIG. 18 and the intra prediction mode of the current block is the horizontal mode or the vertical mode, only N neighboring samples have only to be filtered. Even when the intra prediction mode of the current block is not the horizontal mode nor the vertical mode, only 2N+1 neighboring samples have only to be filtered at most. Therefore, the number of filtering times is reduced to a half, compared with the case where all the neighboring samples are filtered.

On the other hand, in the intra prediction, the decoded intra prediction mode intraPredMode is mapped onto the intra prediction order intraPredOrder and the intra prediction angle intraPredAngle.

Table 7 schematically shows the mapping of the intra prediction mode on the intra prediction order.

TABLE 7

| intraPredMode | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| intraPredOrder | — | — | — | 1 | 5 | 13 | 17 | 21 | 29 | 33 | 3 | 7 | 11 | 15 | 19 | 23 | 27 |
| intraPredMode | 17 | 18 | 19 | 20 | 21 | 22 | 23 | 24 | 25 | 26 | 27 | 28 | 29 | 30 | 31 | 32 | 33 |
| intraPredOrder | 31 | 2 | 4 | 6 | 8 | 10 | 12 | 14 | 16 | 18 | 20 | 22 | 24 | 26 | 28 | 30 | 32 |

The correlation shown in Table 7 can be expressed as in Table 8, by considering the planar mode as the intra prediction mode.

TABLE 8

| intraPredMode  | 0  | 1  | 2  | 3  | 4  | 5  | 6  | 7  | 8  | 9  | 10 | 11 | 12 | 13 | 14 | 15 | 16 | 17 |
|---|---|---|---|---|---|---|---|---|---|---|---|---|---|---|---|---|---|---|
| intraPredOrder | —  | —  | —  | —  | 1  | 5  | 13 | 17 | 21 | 29 | 3  | 3  | 7  | 11 | 15 | 19 | 23 | 27 |
| intraPredMode  | 18 | 19 | 20 | 21 | 22 | 23 | 24 | 25 | 26 | 27 | 28 | 29 | 30 | 31 | 32 | 33 | 34 |    |
| intraPredOrder | 31 | 2  | 4  | 6  | 8  | 10 | 12 | 14 | 16 | 18 | 20 | 22 | 24 | 26 | 28 | 30 | 32 |    |

Table 9 schematically shows the mapping of the intra prediction mode on the intra prediction angle.

TABLE 9

| intraPredOrder | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| intraPredAngle | — | -32 | -26 | -21 | -17 | -13 | -9 | -5 | -2 | — | 2 | 5 | 9 | 13 | 17 | 21 | 26 |
| intraPredOrder | 17 | 18 | 19 | 20 | 21 | 22 | 23 | 24 | 25 | 26 | 27 | 28 | 29 | 30 | 31 | 32 | 33 |
| intraPredAngle | 32 | -26 | -21 | -17 | -13 | -9 | -5 | -2 | — | 2 | 5 | 9 | 13 | 17 | 21 | 26 | 32 |

Figure 19:
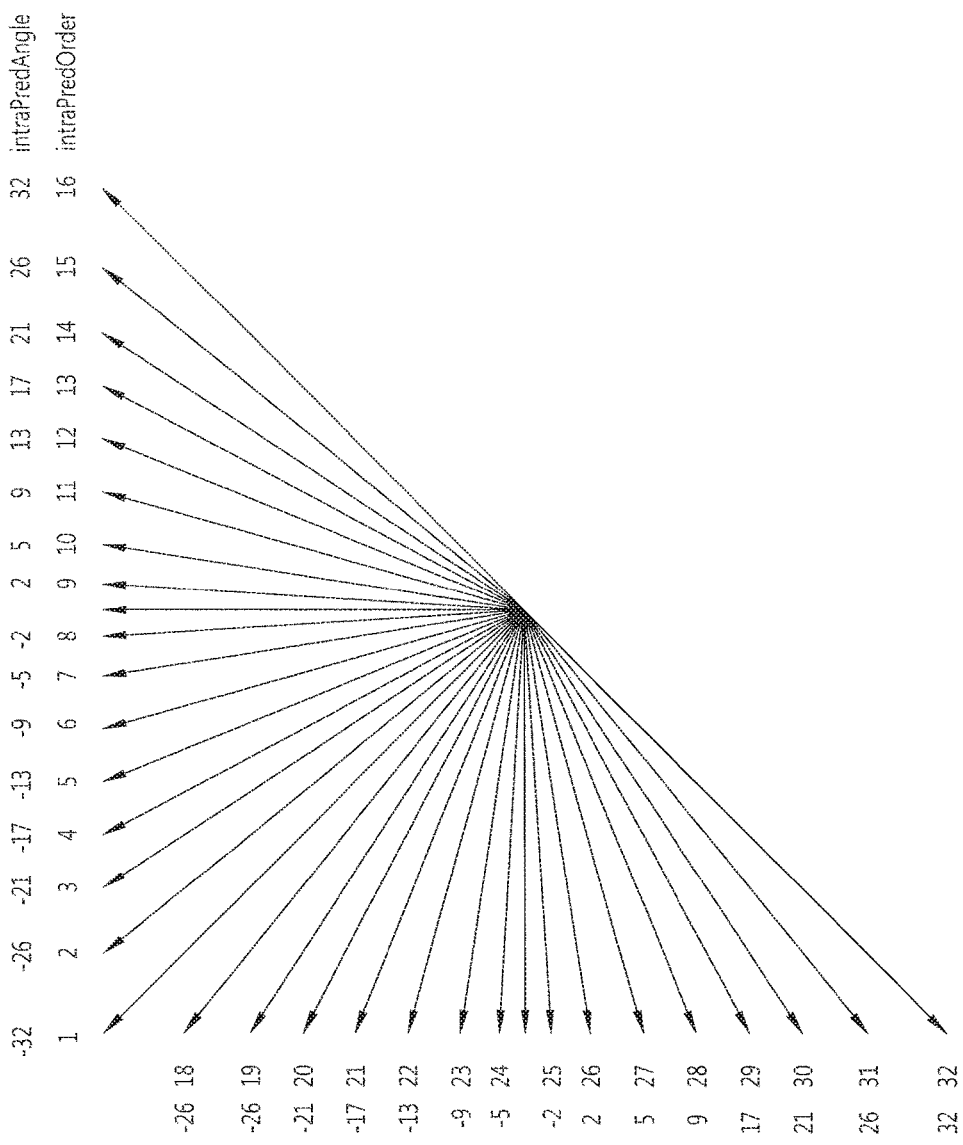
FIG. 19 is a diagram schematically illustrating a mapping relationship of intra prediction modes, intra prediction orders, and intra prediction angles shown in Tables 7 and 9.

FIG. 19 is a diagram schematically illustrating the mapping relationship of the intra prediction mode intraPredMode, the intra prediction order intraPredOrder, and the intra prediction angle intraPredAngle shown in Table 7 and Table 9.

As described with reference to FIG. 18, in the system according to the invention, only some samples which can be used as the reference samples in the intra prediction of a current block out of the neighboring samples of the current block can be subjected to the MDIS filtering.

Figure 20:
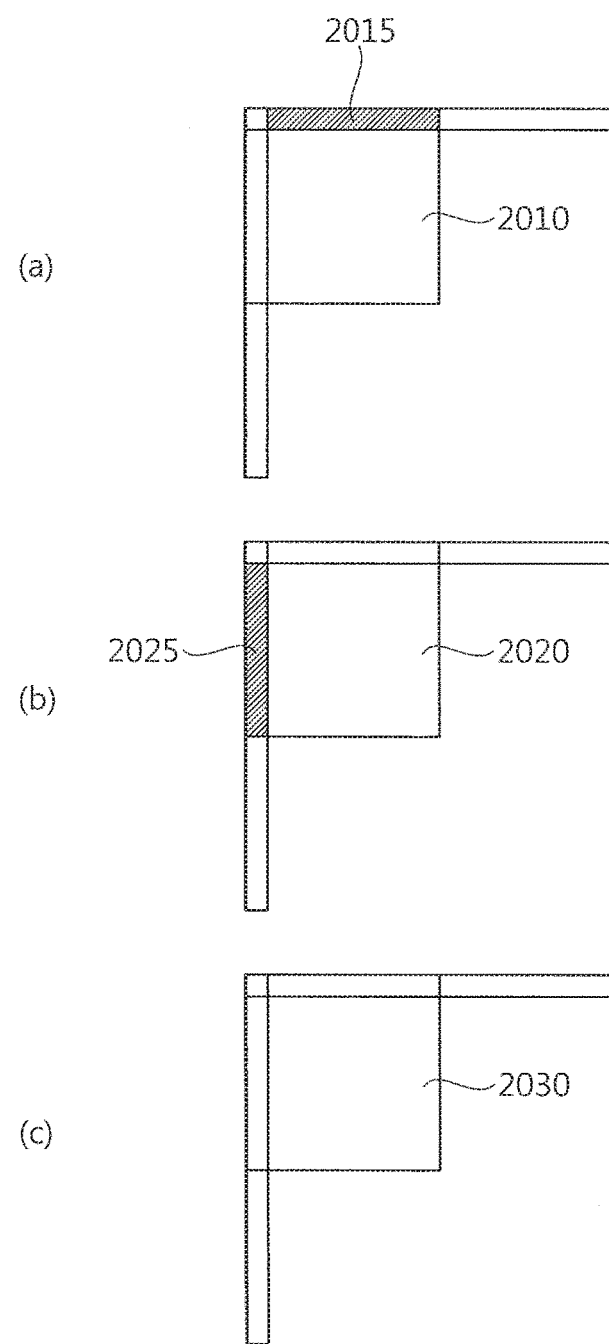
FIG. 20 is a diagram schematically illustrating samples to be subjected to MDIS filtering out of neighboring samples of a current block when the intra prediction mode of the current block is a vertical mode, a horizontal mode, and a DC mode.

FIG. 20 is a diagram schematically illustrating samples to be subjected to the MDIS filtering out of the neighboring samples of a current block when the intra prediction mode of the current block is the vertical mode, the horizontal mode, and the DC mode.

FIG. 20(a) shows a case where the intra prediction mode of a current block is the vertical mode. Referring to FIG. 20(a), when the intra prediction mode of a current block 2010 is the vertical mode, neighboring samples 2015 located on the top side of the current block 2010 are subjected to the filtering.

FIG. 20(b) shows a case where the intra prediction mode of a current block is the horizontal mode. Referring to FIG. 20(b), when the intra prediction mode of a current block 2020 is the horizontal mode, neighboring samples 2025 located on the top side of the current block 2020 are subjected to the filtering.

FIG. 20(c) shows a case where the intra prediction mode of a current block is the DC mode. Referring to FIG. 20(c), when the intra prediction mode of a current block 2030 is the vertical mode, neighboring samples of the current block 2030 are not subjected to the filtering.

In the modes other than the vertical mode, the horizontal mode, and the DC mode, for example, in an angular prediction mode in which a so-called "directional prediction" is performed, the neighboring samples to be filtered can be determined in the same way.

Figure 21:
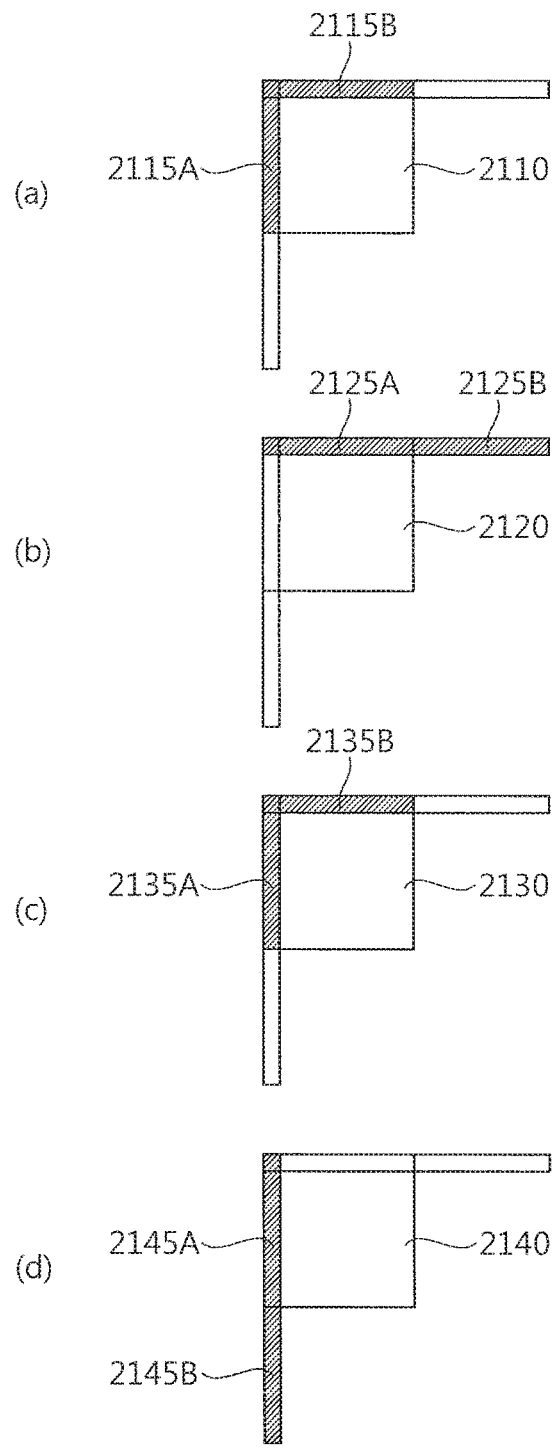
FIG. 21 is a diagram schematically illustrating samples to be subjected to MDIS filtering out of neighboring samples of a current block when the intra prediction mode of the current block is an angle prediction mode.

FIG. 21 is a diagram schematically illustrating samples to be subjected to the MDIS filtering out of the neighboring samples of a current block when the intra prediction mode of the current block is the angular prediction mode.

FIG. 21(a) shows a case where the intra prediction order of a current block is smaller than 18 and the intra prediction angle of the current block is smaller than 0. Referring to FIG. 19, FIG. 21(a) shows a case where the intra prediction mode direction of the current block is the left direction of the vertical mode.

Referring to FIG. 21(a), when the prediction mode direction of the current block is the left direction of the vertical mode, left neighboring samples 2115A of the current block 2110, top neighboring samples 2115B, and a neighboring sample neighboring the top-left corner of the current block 2110 are subjected to the filtering.

FIG. 21(b) shows a case where the intra prediction order of a current block is smaller than 18 and the intra prediction angle of the current block is larger than 0. Referring to FIG. 19, FIG. 21(b) shows a case where the intra prediction mode direction of the current block is the right direction of the vertical mode.

Referring to FIG. 21(b), when the intra prediction mode direction of the current block is the right direction of the vertical mode, top neighboring samples 2125A of the current block 2120, top-right neighboring samples 2125B, and a neighboring sample neighboring the top-left corner of the current block 2120 are subjected to the filtering.

FIG. 21(c) shows a case where the intra prediction order of a current block is larger than or equal to 18 and the intra prediction angle of the current block is smaller than 0. Referring to FIG. 19, FIG. 21(c) shows a case where the intra prediction mode direction of the current block is the top direction of the horizontal mode.

Referring to FIG. 21(c), when the intra prediction mode direction of the current block is the top direction of the horizontal mode, left neighboring samples 2135A of the current block 2130, top neighboring samples 2135B, and a neighboring sample neighboring to the top-left corner of the current block 2130 are subjected to the filtering.

FIG. 21(d) shows a case where the intra prediction order of a current block is larger than or equal to 18 and the intra prediction angle of the current block is larger than 0. Referring to FIG. 19, FIG. 21(d) shows a case where the intra prediction mode direction of the current block is the bottom direction of the horizontal mode.

Referring to FIG. 21(d), when the intra prediction mode direction of the current block is the bottom direction of the horizontal mode, left neighboring samples 2145A of the current block 2140, top-left neighboring samples 2145B, and a neighboring sample neighboring the top-left corner of the current block 2140 are subjected to the filtering.

Figure 22:
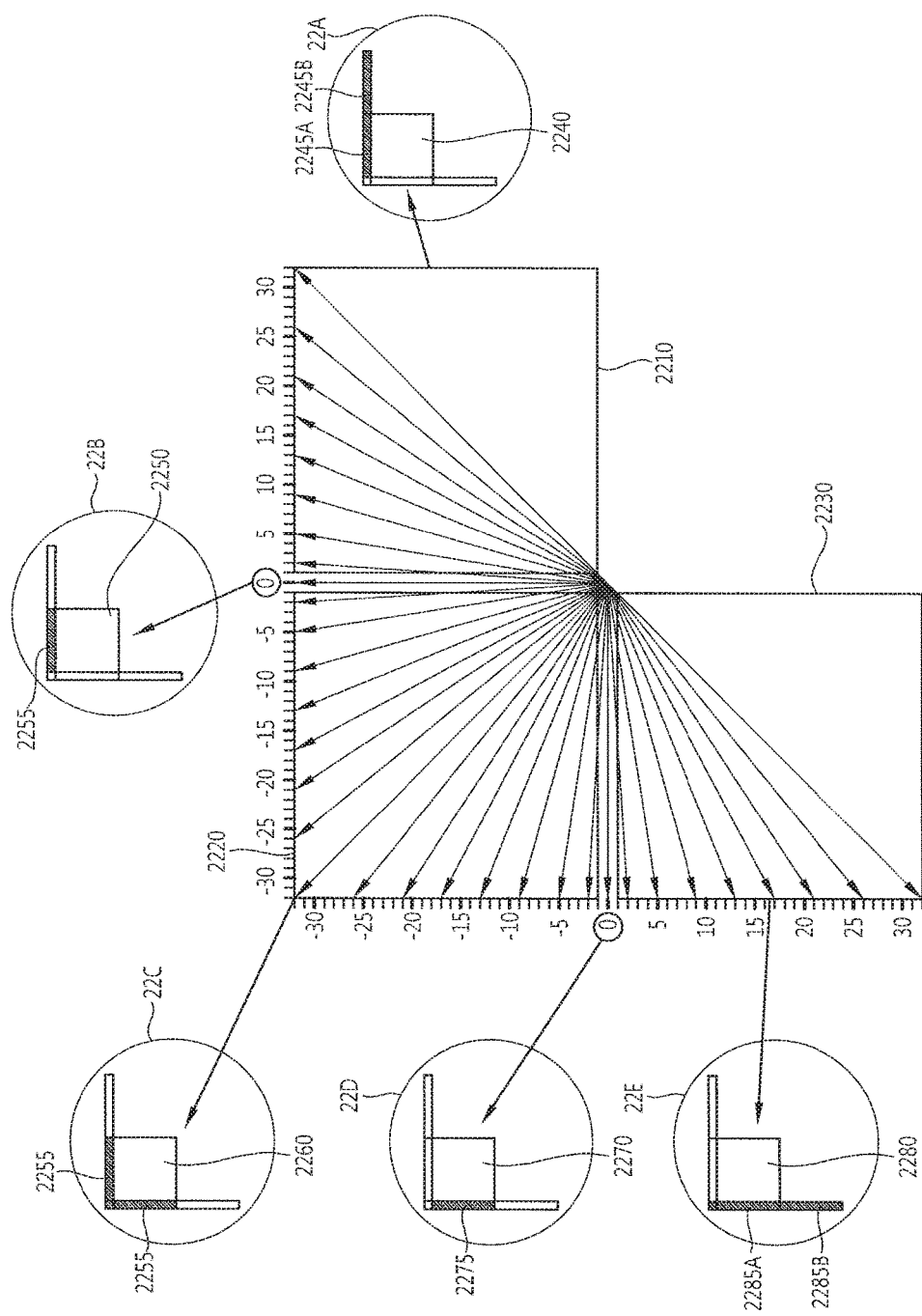
FIG. 22 is a diagram schematically illustrating neighboring samples which are filtered on the basis of an intra prediction mode out of neighboring samples of a current block in the system according to the invention.

Details of FIGS. 20 and 21 can be arranged into FIG. 22.

FIG. 22 is a diagram schematically illustrating samples to be filtered depending on the intra prediction mode out of neighboring samples of a current block in the system according to the invention.

Referring to FIG. 22, when the intra prediction mode is the right direction of the vertical mode (2210) neighboring samples 2245A located on the top side of a current block 2240 and neighboring samples 2245B located on the top-left side are used to predict the current block 2240 as shown in 22A.

When the intra prediction mode is the vertical mode, neighboring samples 2255 located on the top side of a current block 2250 are used to predict the current block 2250 as shown in 22B.

When the prediction direction of the intra prediction mode is the left direction of the vertical mode and the top direction of the horizontal mode (2220), neighboring samples 2265A located on the top side of a current block 2260, neighboring samples 2265B located on the left side, and a neighboring sample neighboring the top-left side of the current block 2260 are used to predict the current block 2260 as shown in 22C.

When the intra prediction mode is the horizontal mode, neighboring samples 2275 located on the left side of a current block 2270 are used to predict the current block 2270 as shown in 22D.

When the prediction direction of the intra prediction mode is the bottom direction of the horizontal mode (2230), neighboring samples 2285A located on the left side of a current block 2280, neighboring samples 2285B located on the bottom-left side, and a neighboring sample neighboring to the top-left side of the current block 2280 are used to predict the current block 2280 as shown in 22E.

On the other hand, as described above, when the MDIS (CRSI) is applied, it can be determined whether the neighboring samples of the current block should be filtered depending on the intra prediction mode and the size of the current block.

As described with reference Table 6, it is determined whether the neighboring samples of the current block should be filtered depending for each size and each intra prediction mode of the current block using the table. As described above, predetermined info nation indicating whether the filtering should be applied can be constructed and it can be determined whether the filtering should be applied depending on the value of the information. For example intraFilterType used in Table 6 can be used as the field value for determining whether the filtering should be applied. When intraFilterType is used, as described with reference to Table 6, the filtering is applied in case of the intraFilterType value of 1 and the filtering is applied in case of the intraFilterType of 0.

Table 10 shows an example schematically illustrating a method of determining whether the filtering should be applied depending on the size and the intra prediction mode of a prediction unit to which the current block belongs. Unlike in Table 6, Table 10 shows all the intra prediction modes.

TABLE 10

| IntraPredMode | intraFilterType (4 × 4 PU) | intraFilterType (8 × 8 PU) | intraFilterType (16 × 16 PU) | intraFilterType (32 × 32 PU) | intraFilterType (64 × 64 PU) |
|---|---|---|---|---|---|
| 0 | 0 | 0 | 0 | 0 | 0 |
| 1 | 0 | 0 | 0 | 0 | 0 |
| 2 | 0 | 0 | 0 | 0 | 0 |
| 3 | 1 | 1 | 1 | 1 | 1 |
| 4 | 0 | 1 | 1 | 1 | 1 |
| 5 | 0 | 1 | 1 | 1 | 0 |
| 6 | 1 | 1 | 1 | 1 | 0 |
| 7 | 0 | 1 | 1 | 1 | 0 |
| 8 | 0 | 1 | 1 | 1 | 0 |
| 9 | 1 | 1 | 1 | 1 | 0 |
| 10 | 0 | 0 | 1 | 1 | 0 |
| 11 | 0 | 0 | 1 | 1 | 0 |
| 12 | 0 | 0 | 1 | 1 | 0 |
| 13 | 0 | 0 | 1 | 1 | 0 |
| 14 | 0 | 0 | 1 | 1 | 0 |
| 15 | 0 | 0 | 1 | 1 | 0 |
| 16 | 0 | 0 | 1 | 1 | 0 |
| 17 | 0 | 0 | 1 | 1 | 0 |
| 18-33 | 0 | 0 | 0 | 1 | 0 |

In Table 10, a case where the planar mode is not considered depending on the intra prediction mode shown in FIG. 3. Therefore, as an example where all the intra prediction modes (the DC mode, the planar mode, and the luma referent mode for chroma samples) not having directionality are considered and all of the vertical mode, the vertical+1 to vertical+8 modes, the vertical−1 to vertical−8 modes the horizontal modem,the horizontal+1 to horizontal+8 modes, and the horizontal−1 to horizontal−8 modes are considered, the method of determining whether the filtering should be applied as in the example of Table 11 may be considered.

TABLE 11

| IntraPredMode | intraFilterType (4 × 4 PU) | intraFilterType (8 × 8 PU) | intraFilterType (16 × 16 PU) | intraFilterType (32 × 32 PU) | intraFilterType (64 × 64 PU) |
|---|---|---|---|---|---|
| 0-2 | 0 | 0 | 0 | 0 | 0 |
| 3 | 0 | 1 | 1 | 1 | 0 |
| 4, 5 | 0 | 0 | 1 | 1 | 0 |
| 6 | 0 | 1 | 1 | 1 | 0 |
| 7, 8 | 0 | 0 | 1 | 1 | 0 |
| 9 | 0 | 1 | 1 | 1 | 0 |
| 10-20 | 0 | 0 | 1 | 1 | 0 |
| 21, 22 | 0 | 0 | 0 | 1 | 0 |
| 23-28 | 0 | 0 | 1 | 1 | 0 |
| 29, 30 | 0 | 0 | 0 | 1 | 0 |
| 31-33 | 0 | 0 | 1 | 1 | 0 |
| 34 | 0 | 1 | 1 | 1 | 0 |
| 35 | n/a | n/a | n/a | n/a | n/a |

Referring to Table 10 or Table 11, when the value of intraFilterType corresponding to the size and the intra prediction mode of the prediction unit to which the current block belongs is 1, the filtering, that is, the MDIS, is applied to the neighboring samples of the current block. By smoothing the neighboring reference samples of the current block using the MDIS, it is possible to improve the intra prediction performance. At this time, as described above, the filtering (MDIS) can be performed using a 3-tap filter or a 5-tap filter.

when the value of intraFilterType corresponding to the size and the intra prediction mode of the prediction unit to which the current block belongs is 0, the filtering is not applied to the neighboring samples of the current block.

Figure 23:
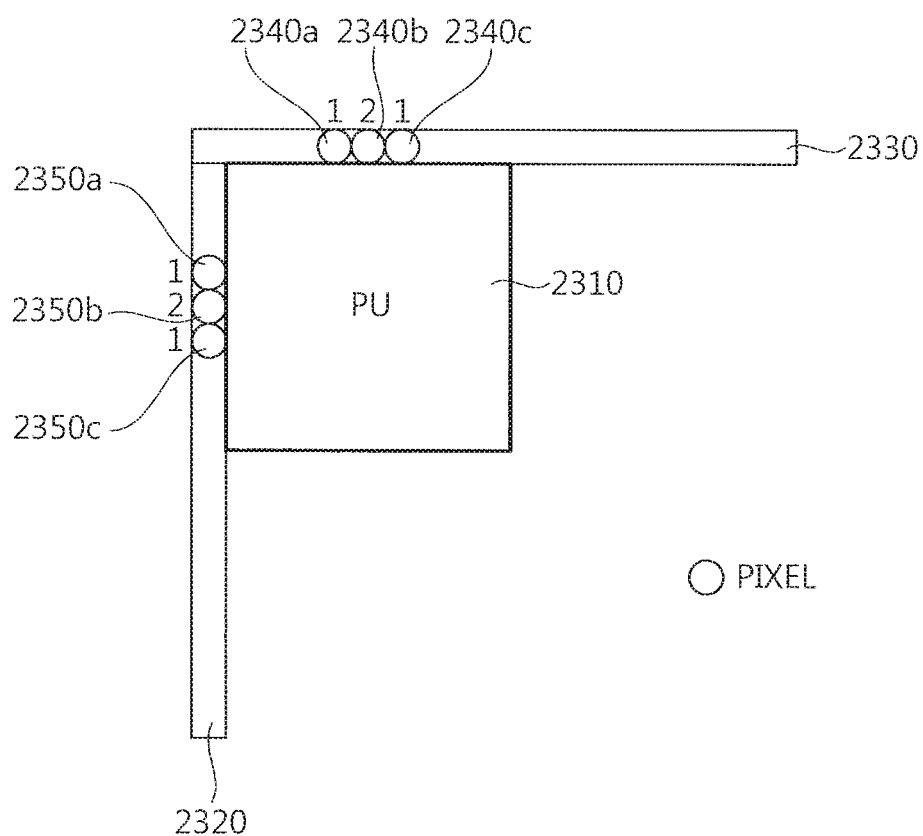
FIG. 23 is a diagram schematically illustrating a method of applying the MDIS using a 3-tap filter.

FIG. 23 is a diagram schematically illustrating the method of applying the MDIS using a 3-tap filter. Referring to FIG. 23, neighboring samples 2320 and 2330 of a current block 2310 are smoothed using the 3-tap filter. The application time of the smoothing, that is, the application time of the MDIS, is after substitution with the reference samples and before setting the pixel values of the current block to the reference pixel values through the use of the prediction, as described above.

When the MIDIS is applied using the 3-tap filter, the interpolation (filtering) is performed using the left and right samples or the top and bottom samples of the neighboring samples to be filtered. For example, when a target neighboring sample 2340*b* or a target neighboring sample 2340*b* is filtered, the 3-tap filter can be applied to the left and right samples 2340*a* and 2340*c* and the target neighboring sample 2340*b*. At this time, [1 2 1] can be used as an example of the filtering coefficient. When a target neighboring sample 2350*b* is filtered, the 3-tap filter can be applied to the top and bottom samples 2350*a* and 2350*c* and the target neighboring sample 2350*b*. At this time [1 2 1] can be used as an example of the filtering coefficient.

However, another type of smoothing can be applied to the intra prediction mode not having directionality, for example, the DC mode. For example, referring to Table 10 or Table 11, the smoothing is not applied to the DC mode. In Table 10 based on the intra mode indexing shown in FIG. 3, it can be seen that the value of intraFilterType of IntraPredMode 2 which is the DC mode is 0. In Table 11 based on the intra mode indexing shown in FIG. 4, it can be seen that the value of intraFilterType of IntraPredMode 3 which is the DC mode is 0.

Therefore, In the DC mode, the smoothing such as the MDIS is not performed before the intra prediction, that is, before filling the pixel values of the block by prediction, but it can be considered that the filtering is performed to minimize the discontinuity of block boundaries.

Figure 24:
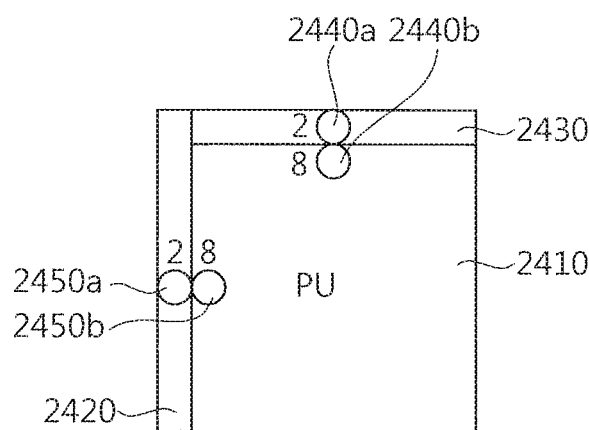
FIG. 24 is a diagram schematically illustrating a method of applying a filtering operation when the intra prediction mode of a current block is a DC mode.

FIG. 24 is a diagram schematically illustrating the method of applying the filtering when the intra prediction mode of a current block is the DC mode. Referring to FIG. 24, a 2-tap filter is applied to samples 2440*b* and 2450*b* of a predicted current block 2410 and neighboring samples 2440*a* and 2450*a* of the current block. For example, when the neighboring samples 2430 on the top side of the current block 2410 are filtered, the 2-tap filter can be applied to the neighboring sample 2440*a* and the pixel 2440*b* of the current block neighboring the same position in the horizontal direction (x axis direction) as the neighboring sample 2440*a*. When the neighboring samples 2420 on the left side of the current block 2410 are filtered, the 2-tap filter can be applied to the neighboring sample 2450*a* and the pixel 2450*b* of the current block neighboring the same position in the vertical direction (y axis direction) as the neighboring sample 2450*a*.

At this time, [2 8] shown in the drawing can be used an example of the filtering coefficient to the applied, but the invention is not limited thereto. For example, the filtering coefficient may be adaptively determined using neighboring contexts or information on the filtering coefficient may be determined by the encoder and may be transmitted to the decoder For the purpose of convenience for explanation, the 2-tap filtering applied to the DC mode as described with reference to FIG. 23 is referred to as an MDTF (Mode Dependent Two-tap Filtering).

In the invention, it is possible to effectively minimize the discontinuity of the block boundaries by applying the MDTF to a case where the MDIS is not applied as well as a case where the intra prediction mode of a current block is the DC mode. The MDTF is applied when the MDIS is not applied. Therefore,it can be determined whether the MDTF should be applied in consideration of the size and the intra prediction mode of a current block using Table 10 or Table 11.

Hereinafter, an MDTF application method will be specifically described.

MDTF Application Method 1

As an MDTF application method, a method of applying the MDTF to all the cases where the MDIS is not applied. For example, the MDTF is applied to the case where the value of intraFilterType in Table 10 or Table 11 is 0. Here, the MDTF is not applied to al neighboring samples of the current block, but may be applied to only the top neighboring pixels or the left neighboring pixels of the current block depending on the intra prediction mode of the current block. Alternatively, the MDTF may be applied to only the neighboring reference pixels actually used in the intra prediction of the current block.

Figure 25:
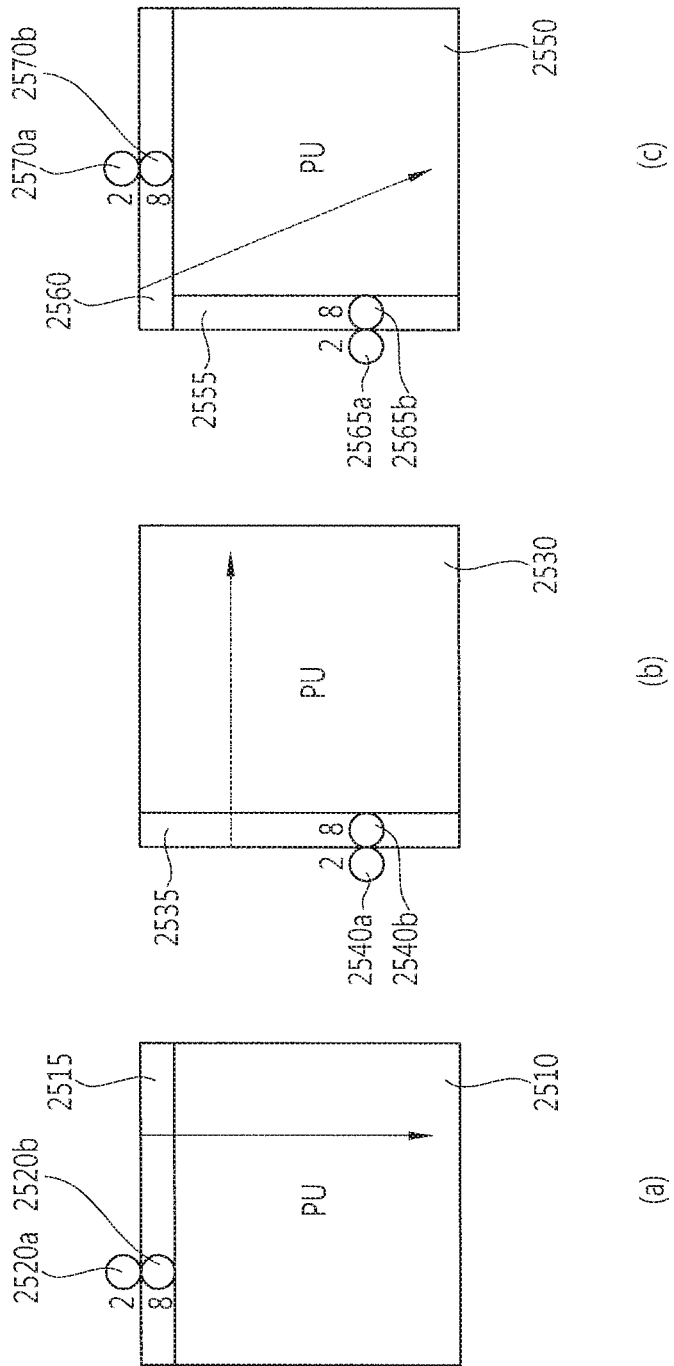
FIG. 25 is a diagram schematically illustrating application of an MDTF in the system according to the invention depending on the intra prediction mode of a current block.

FIG. 25 is a diagram schematically illustrating an example where the MDTF is applied in the system according to the invention depending on the intra prediction mode of a current block.

FIG. 25(a) shows an MDTF application example when the intra prediction mode of a current block 2510 is the vertical mode. Referring to Table 10 or Table 11, the MDIS is not applied to the vertical mode. Referring to FIG. 25(a), when the intra prediction mode of the current block 2510 is the vertical mode, the MDTF is applied to the top neighboring samples 2515 used in h intra prediction of the current block. Therefore, the 2-tap filtering is performed on the neighboring sample 2520a and the pixel 2520b of the current block. In the example shown in FIG. 25(a), [2 8] is used as the filtering coefficient.

FIG. 25(b) shows an MDTF application example when the intra prediction mode of a current block 2530 is the horizontal mode, Referring to Table 10 or Table 11, the MDIS is not applied to the horizontal mode. Referring to FIG. 25(b), when the intra prediction mode of the current block 2530 is the horizontal mode, the MDTF is applied to the left neighboring samples 2535 used in the intra prediction of the current block. Therefore, the 2-tap filtering is performed on the neighboring sample 2540a and the pixel 2540b of the current block in the example shown in FIG. 25(b), [2 8] is used as the filtering coefficient.

FIG. 25(c) shows an MDTF application example when the intra prediction mode of a current block 2550 is a directional mode and the MDIS is not applied. Referring to FIG. 25(a), since all the top n boring sample 2560 and the left neighboring sample 2555 of the current block 2550 can be used in the intra prediction of the current block 2550, the MDTF is applied to the top neighboring samples 2560 and the left neighboring sample 2555 of the current block. Therefore, the 2-tap filtering is performed on the neighboring sample 2565a, the pixel 2565b of the current block, and the neighboring samples 2570a and 2570b. In the example shown in FIG. 25(c), [2 8] is used as the filtering coefficient.

Therefore, according to the example shown in FIG. 25, the value of intraFilterType in Table 10 and Table 11 can be newly defined. For example, it can be defined to instruct to apply the 2-tap filtering boundary pixels inside or outside of a current block when the value of intraFilterType is 0 and to instruct to apply the filtering to the reference samples when the value of intraFilterType is 1. At this time, the 2-tap filtering on the boundary pixels inside or outside the current block may be the MDTF, and the filtering on the reference samples may be the MDIS using a 3-tap filter having a filtering coefficient of [1 ].

MDTF Application Method 2

Unlike as in the example shown in FIG. 25, a method of applying the MDTF when the value of intraFilterType in Table 10 or Table 11 is 0 and selectively applying the MDIS and the MDTF when the value of intraFilterType is 1. For example, when the value of intraFilterType is 1, the encoder can dictate whether the MDTF should be applied or the MDIS should be applied, by transmitting a 1-bit flag. It can also be indicated whether the filtering should be applied to the reference samples or whether the 2-tap filter applied to the DC mode should be applied. At this time, a 3-tap filter with a filtering coefficient of [1 2 1] can be used in the MDIS, and a 2-tap filter with a filtering coefficient [2 8] can be used in the MDTF.

MDTF Application Method 3

Unlike the above-mentioned application methods, the MDTF may not be applied to any case e the MDIS is not applied in Table 10 and Table 11 and the MDTF may be applied to only a case where the intra prediction mode of a current block is a predetermined intra prediction mode.

For example, the MDTF can be applied to only the cases where the value of intraFilterType in Table 10 and Table 11 is 0 and the intra prediction mode of the current block is the vertical mode, the horizontal mode, and the non-directional mode (for example, the DC mode or the planar mode).

On the other hand, in MDTF application methods 1 and 2, when the intra prediction mode of the current block is neither the vertical mode nor the horizontal mode and is the angular prediction mode, the positions of the neighboring samples to which the MDTF filtering applied is not the same horizontal positions (positions in the x axis) or the same vertical positions (positions in the y axis) as the target pixels in the current block, but may be the positions on the top-right side or the top-left side.

Figure 26:
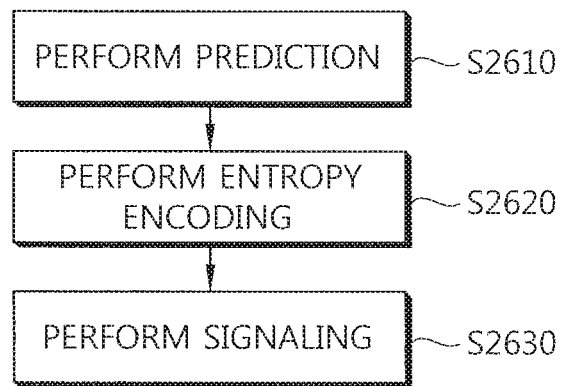
FIG. 26 is a diagram schematically illustrating an operation of an encoder in the system according to the invention.

FIG. 26 is a diagram schematically illustrating an operation of an encoder in the system according to the invention. Referring to FIG. 26, the encoder performs a prediction process on a current block (S2610). The encoder can perform an intra prediction operation or an inter prediction operation on the current block. The prediction can be performed in consideration of the partition size, the slice type, and the like of the current block.

The encoder may determine a filtering coefficient of the CRSI (MDIS) and may transmit information on the determined filtering coefficient to the decoder, when the CRSI (MDIS) is applied in the process of performing the intra prediction. When the information on the filtering coefficient is not transmitted, the decoder may derive the filtering coefficient from context information as described above. When the filtering coefficient is determined in advance by the encoder and the decoder, the encoder may not transmit the information on the filtering coefficient separately.

The encoder entropy-encodes the prediction result of the current block (S2620). As described above, methods such as CABAC and CAVLC can be used for the entropy encoding, and code words may be assigned in consideration of the appearance frequency of each prediction mode or prediction type.

The encoder signals the entropy-encoded information (S2620). In signaling the information on the prediction mode, an application of a specific prediction mode/prediction type may be signaled using particular information such as a flag, or elements of the prediction type may be joint-coded at a time and what prediction mode of plural prediction modes is applied may be signaled.

Details of the method of assigning code words in consideration of the appearance frequencies of the prediction types/prediction modes and the method of signaling the information on the prediction are the same s described above.

Figure 27:
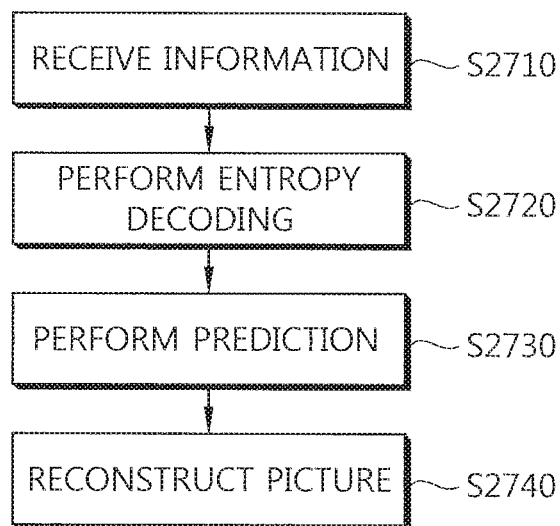
FIG. 27 is a diagram schematically illustrating an operation of a decoder in the system according to the invention.

FIG. 27 is a diagram schematically illustrating an operation of a decoder in the system according to the invention. Referring to FIG. 27, the decoder receives information from the encoder (S2710). The information received from the encoder may be included in a bitstream and includes information on the prediction of a current block.

Subsequently,the decoder performs an entropy decoding process to extract necessary information (S2720). The decoder determines what prediction type of the prediction types (such as the PCM, the inter prediction, and the intra prediction) is applied to the current block and what mode in the intra prediction is applied to the current block, on the basis of the extracted information. The method of determining prediction modes is the same as described above.

The decoder performs a prediction process on the current block (S2730). The decoder performs the prediction process on the basis of the prediction mode of the current block. The specific method of performing the prediction process on the basis of the prediction mode of the current block is the same as described above.

The decoder reconstructs a picture the current block on the basis of the predicted result (S2740).

Figure 28:
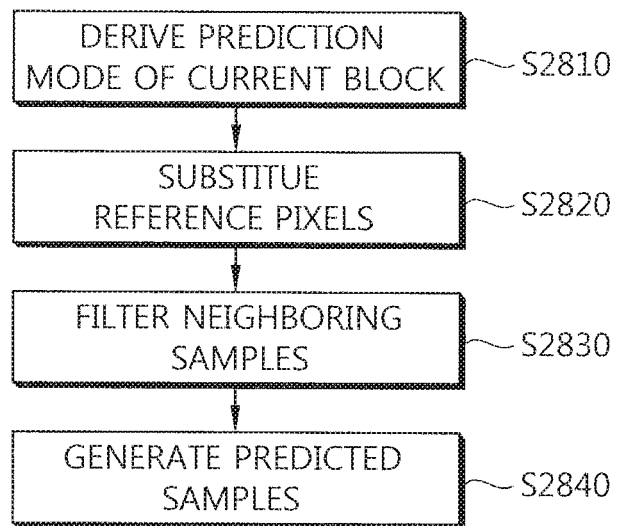
FIG. 28 is a flowchart schematically illustrating an intra prediction operation in a prediction step of the decoder on a current block in the system according to the invention.

FIG. 28 is a flowchart schematically illustrating an intra prediction operation in a prediction step of the decoder on a current block in the system according to the invention.

Referring to FIG. 28, the decoder derives the prediction mode of the current block (S2810). The prediction mode of the current block may be determined from a predetermined number of MPMs selected from the neighboring block or may be determined from residual modes separately transmitted from the encoder.

The decoder determines availability of the neighboring samples of the current block and substitutes u available samples with reference samples (S2820). When a sample located at an unavailable address is present neighboring samples of the current block, the decoder determines that the corresponding sample a sample (unavailable sample) not available for the intra prediction of the current block. When the current block is predicted with only the intra prediction mode and a sample predicted with a mode other the intra prediction mode is present in the neighboring samples of the current block, the corresponding sample is determined to be a sample not available for the intra prediction of the current block. The decoder performs reference sample substitution of substituting the unavailable samples with available samples. The specific method is the same as described above. The decoder can construe reference samples to be used in the intra prediction of the current block through the use of the reference sample substitution.

Subsequently, the decoder performs a filtering process on the neighboring samples (S2830). The filtering process can be performed using a predetermined number of neighboring samples in the direction of the intra prediction mode depending on the intra prediction mode of the current block. The number of neighboring samples used in the filtering may be determined in advance or information on the number of neighboring samples used in the filtering may be transmitted from the encoder to the decoder. The filtering coefficient used in the filtering may be determined in advance or may be derived from the context by the decoder, or information on the filtering coefficient may be transmitted from the encoder to the decoder. In addition, depending on the intra prediction mode of the current block, only the neighboring samples available in the intra prediction may be filtered. The decoder may selectively perform the filtering process depending on the size and the intra prediction mode of the current block. When performing the filtering process, the decoder can construct modified reference samples to be used in the intra prediction of the current block.

The decoder generates predicted samples (S2840). The decoder performs a prediction process of generating predicted samples by copying the (modified) reference samples located in the prediction direction to the pixel positions of the current block depending on the intra prediction mode of the current block.

On the other hand, the decoder may apply a 2-tap DC filtering (MDTF) on the generated predicted samples as described above.

While the methods in the above-mentioned exemplary system have been described on the basis of flowcharts including a series of steps or blocks, the invention is not limited to the order of steps and a certain step may be performed in a step or an order other than described above or at the same time as described above. The above-mentioned embodiments can include various examples. Therefore, the invention includes all substitutions, corrections, and modifications belonging to the appended claims.

When it is mentioned above that an element is "connected to" or "coupled to" another element, it should be understood that still another element may be interposed therebetween, as well as that the element may be connected or coupled directly to another element. On the contrary, when it is mentioned that an element is "connected directly to" or "coupled directly to" another element, it should be understood that still another element is not interposed therebetween.

What is claimed is:

1. An intra prediction method, by a decoding apparatus, the method comprising:
   determining an intra prediction mode of a current block, wherein the intra prediction mode is determined as a directional prediction mode from intra prediction modes including 33 directional prediction modes and at least one non-directional prediction mode;
   deriving neighboring reference samples of the current block;
   performing filtering on at least one of the reference samples; and
   generating a prediction sample of the current block based on a filtered reference sample,
   wherein the filtered reference sample is filtered by using a first reference sample located in a prediction direction of the intra prediction mode with regard to a location of the prediction sample and reference samples adjacent to the first reference sample, and
   wherein when the first reference sample is located on an upper side of the current block, the reference samples adjacent to the first reference sample includes a second reference sample located on a left side of the first reference sample and a third reference sample located on a right side of the first reference sample.

2. The method of claim 1, wherein a filtering coefficient for the first reference sample is greater than filtering coefficients for the reference samples adjacent to the first reference sample.

3. The method of claim 1, wherein the filtered reference sample is filtered by applying a 3-tap filter with a filtering coefficient of [1 2 1] to the first reference sample.

4. The method of claim 1, wherein the filtered reference sample is filtered by applying a filtering using a 3-tap filter to the first reference sample, the second reference sample, and the third reference sample to generate the filtered reference sample at the position of the first reference sample.

5. The method of claim 1, wherein the intra prediction mode is a prediction mode having an up-right diagonal prediction direction.

6. The method of claim 1, wherein the intra prediction mode is a prediction mode having an up-left diagonal prediction direction o.

7. The method of claim 1, wherein the intra prediction mode is a prediction mode having a down-left diagonal prediction direction.

8. The method of claim 1, wherein it is determined whether the filtering is performed depending on a size and the intra prediction mode of the current block.

9. The method of claim 8, wherein when it is determined that the filtering is not performed, the prediction sample is generated based on the first reference sample, and wherein a smoothing process using 2-tap coefficients is performed on the first reference sample.

10. The method of claim 1, wherein the first reference sample is filtered by the following equation:

$$(r(x-1)+2*r(x)+r(x+1)+2)>>2,$$

where r(x) represents a sample value of the first reference sample, r(x−1) represents a sample value of the second reference sample located on the left side of the first reference sample, and r(x+1) represents a sample value of the third reference sample located on the right side of the first reference sample.

11. An image encoding method using intra prediction, by an encoding apparatus, the method comprising:
   determining an intra prediction mode of a current block, wherein the intra prediction mode is determined as a directional prediction mode from intra prediction modes including 33 directional prediction modes and at least one non-directional prediction mode;
   deriving neighboring reference samples of the current block;
   performing filtering on at least one of the reference samples;
   generating a prediction sample of the current block based on a filtered reference sample; and
   encoding image information including prediction mode information indicating the intra prediction mode of the current block,
   wherein the filtered reference sample is filtered by using a first reference sample located in a prediction direction of the intra prediction mode with regard to a location of the prediction sample and reference samples adjacent to the first reference sample, and
   wherein when the first reference sample is located on an upper side of the current block, the reference samples adjacent to the first reference sample includes a second reference sample located on a left side of the first reference sample and a third reference sample located on a right side of the first reference sample.

12. A non-transitory computer-readable storage medium storing image information, the image information, when executed, causing a decoding apparatus to perform the following steps:
   determining an intra prediction mode of a current block based on the image information, wherein the intra prediction mode is determined as a directional prediction mode from intra prediction modes including 33 directional prediction modes and at least one non-directional prediction mode;
   deriving neighboring reference samples of the current block;
   performing filtering on at least one of the reference samples; and
   generating a prediction sample of the current block based on a filtered reference sample,
   wherein the filtered reference sample is filtered by using a first reference sample located in a prediction direction of the intra prediction mode with regard to a location of the prediction sample and reference samples adjacent to the first reference sample, and
   wherein when the first reference sample is located on an upper side of the current block, the reference samples adjacent to the first reference sample includes a second reference sample located on a left side of the first reference sample and a third reference sample located on a right side of the first reference sample.

* * * * *